United States Patent
Kreutzman

(10) Patent No.: US 10,571,135 B2
(45) Date of Patent: Feb. 25, 2020

(54) RENEWABLE ENERGY HOT WATER HEATER WITH HEAT PUMP

(71) Applicant: David Kreutzman, Louisville, CO (US)

(72) Inventor: David Kreutzman, Louisville, CO (US)

( * ) Notice: Subject to any disclaimer, the term of this patent is extended or adjusted under 35 U.S.C. 154(b) by 465 days.

(21) Appl. No.: 14/827,484

(22) Filed: Aug. 17, 2015

(65) Prior Publication Data

US 2015/0354833 A1    Dec. 10, 2015

Related U.S. Application Data

(63) Continuation-in-part of application No. 14/549,723, filed on Nov. 21, 2014, which is a continuation of application No. 13/442,753, filed on Apr. 9, 2012, now Pat. No. 8,909,033, application No. 14/827,484, which is a continuation-in-part of application No. 13/829,320, filed on Mar. 14, 2013, now Pat. No. 9,453,658.

(51) Int. Cl.
     *F24D 19/10*      (2006.01)
     *F24D 17/00*      (2006.01)
     *F24D 17/02*      (2006.01)

(52) U.S. Cl.
     CPC ....... *F24D 19/106* (2013.01); *F24D 17/0021* (2013.01); *F24D 17/0068* (2013.01); *F24D 17/02* (2013.01)

(58) Field of Classification Search
None
See application file for complete search history.

(56) References Cited

U.S. PATENT DOCUMENTS

| | | |
|---|---|---|
| 1,505,179 A | 8/1924 | Whiteley |
| 1,507,544 A | 9/1924 | Cheatham |
| 1,526,204 A | 2/1925 | Campbell |
| 1,662,555 A | 3/1928 | Wojciechowski |
| 2,459,123 A | 1/1949 | Bates |
| 2,666,838 A | 1/1954 | Krah et al. |
| 2,824,945 A | 2/1958 | Derumaux |

(Continued)

FOREIGN PATENT DOCUMENTS

EP    1482255 A1    12/2004

OTHER PUBLICATIONS

Wikipedia; Maximum power point tracking; Dec. 17, 2011; http://web.archive.org/web/20111217125042/http://en.wikipedia.org/wik/Maximum_power_point_tracking.

*Primary Examiner* — Ibrahime A Abraham
*Assistant Examiner* — Gyounghyun Bae
(74) *Attorney, Agent, or Firm* — Snell & Wilmer LLP

(57) ABSTRACT

Provided herein are various systems and methods (i.e., utilities) broadly directed to the generation of hot water using energy derived from renewable energy sources as an alternative to or in conjunction with another power source (e.g., fossil fuel-based energy from a utility provider, an underperforming solar/wind/wind system, etc.). In the various aspects, these utilities are directed to the retrofitting of existing water heaters with electrical heating elements that are connectable to a renewable source of electrical energy. While primarily discussed in relation to retrofitting existing water heaters, various aspects are applicable to OEM manufactured systems. Further, various control methods are provided that allow for enhancing the efficiency of hot water generation, net metering, and/or the generation of renewable energy credits.

9 Claims, 12 Drawing Sheets

(56) References Cited

U.S. PATENT DOCUMENTS

| | | | |
|---|---|---|---|
| 3,286,079 A | 11/1966 | Hynes et al. | |
| 3,737,621 A | 6/1973 | Elkins | |
| 3,989,032 A | 11/1976 | Harrison | |
| 4,037,785 A | 7/1977 | Madern | |
| 4,052,000 A | 10/1977 | Honikman | |
| 4,060,472 A | 11/1977 | Alewitz | |
| 4,166,944 A | 9/1979 | Scott | |
| 4,200,783 A | 4/1980 | Ehret | |
| 4,257,397 A | 3/1981 | Gouyou-Beauchamps | |
| 4,267,432 A | 5/1981 | Kiepe | |
| 4,367,726 A | 1/1983 | Maes, Jr. | |
| 4,404,472 A | 9/1983 | Steigerwald | |
| 4,436,058 A * | 3/1984 | McAlister | F24D 11/0214 122/19.1 |
| 4,447,712 A | 5/1984 | Covillion | |
| 4,467,178 A | 8/1984 | Swindle | |
| 4,527,618 A * | 7/1985 | Fyfe | F24D 11/0221 126/635 |
| 4,697,136 A | 9/1987 | Ishikawa | |
| 4,722,197 A * | 2/1988 | McEntire | F24D 11/0214 237/2 B |
| 4,971,136 A * | 11/1990 | Mathur | F24D 19/1039 165/11.1 |
| 5,159,659 A | 10/1992 | Cameron | |
| 5,168,546 A | 12/1992 | Laperriere | |
| 5,187,349 A | 2/1993 | Curhan et al. | |
| 5,293,447 A * | 3/1994 | Fanney | F24D 19/1057 136/248 |
| 5,314,004 A * | 5/1994 | Strand | F24F 11/00 165/238 |
| 5,866,880 A * | 2/1999 | Seitz | F24H 9/2028 219/483 |
| 5,919,386 A | 7/1999 | James | |
| 6,069,998 A | 5/2000 | Barnes et al. | |
| 6,080,927 A * | 6/2000 | Johnson | F24S 20/20 136/248 |
| 6,111,767 A | 8/2000 | Handleman | |
| 6,205,292 B1 | 3/2001 | Pokorny et al. | |
| 6,283,067 B1 * | 9/2001 | Akkala | F24D 12/02 122/14.22 |
| 6,331,670 B2 | 12/2001 | Takehara et al. | |
| 6,363,218 B1 | 3/2002 | Lowenstein et al. | |
| 6,371,057 B1 | 4/2002 | Henderson | |
| 6,375,087 B1 * | 4/2002 | Day | F24D 19/1051 122/447 |
| 6,412,448 B1 | 7/2002 | Kingston | |
| 6,463,212 B1 | 10/2002 | Salyer | |
| 6,630,622 B2 | 10/2003 | Konold | |
| 6,633,727 B2 | 10/2003 | Henrie et al. | |
| 6,637,727 B1 | 10/2003 | Decker et al. | |
| 6,837,303 B2 | 1/2005 | Butler | |
| 6,861,621 B2 | 3/2005 | Ghent | |
| 6,915,069 B2 | 7/2005 | Bradenbaugh | |
| 7,543,456 B2 * | 6/2009 | Sinha | F24H 4/04 285/139.1 |
| 7,645,931 B2 | 1/2010 | Gibson et al. | |
| 7,793,652 B1 | 9/2010 | Delgado | |
| 7,827,814 B2 | 11/2010 | Slater | |
| 7,860,380 B2 | 12/2010 | Eisenbraun | |
| 7,913,684 B2 | 3/2011 | Butler | |
| 7,971,796 B2 * | 7/2011 | Roques | F24H 1/20 219/506 |
| 8,204,633 B2 | 6/2012 | Harbin et al. | |
| 8,356,481 B2 | 1/2013 | Penev | |
| 8,375,934 B2 | 2/2013 | Zheng | |
| 8,485,178 B2 | 8/2013 | Diaz et al. | |
| 8,511,296 B2 | 8/2013 | Sweet | |
| 8,536,495 B2 | 9/2013 | Lako | |
| 8,618,452 B2 | 12/2013 | Besore et al. | |
| 8,761,589 B2 | 6/2014 | Roetker | |
| 8,909,033 B2 | 12/2014 | Kreutzman | |
| 2001/0003273 A1 | 6/2001 | Overbey, Jr. | |
| 2002/0084655 A1 | 7/2002 | Per-Anders et al. | |
| 2002/0127006 A1 | 9/2002 | Tweedy et al. | |
| 2003/0007790 A1 | 1/2003 | Harris | |
| 2008/0107409 A1 | 5/2008 | Lesage et al. | |
| 2008/0205865 A1 | 8/2008 | Lesage et al. | |
| 2009/0068609 A1 | 2/2009 | Mastov et al. | |
| 2009/0188486 A1 | 7/2009 | Thomasson | |
| 2009/0191500 A1 | 7/2009 | Weng et al. | |
| 2009/0211567 A1 | 8/2009 | Thomasson | |
| 2009/0214195 A1 * | 8/2009 | Thomasson | F24D 11/003 392/451 |
| 2009/0301468 A1 | 12/2009 | Gray et al. | |
| 2010/0025488 A1 * | 2/2010 | Park | F24D 3/08 237/2 B |
| 2010/0031953 A1 | 2/2010 | Penev | |
| 2010/0101621 A1 | 4/2010 | Xu | |
| 2010/0108290 A1 * | 5/2010 | Maxwell | F24D 3/10 165/62 |
| 2010/0187219 A1 | 7/2010 | Besore et al. | |
| 2010/0319681 A1 | 12/2010 | Li | |
| 2011/0000543 A1 | 1/2011 | Errico | |
| 2011/0004178 A1 | 1/2011 | Fernkvist et al. | |
| 2011/0017201 A1 | 1/2011 | Yang | |
| 2011/0017273 A1 | 1/2011 | Roach et al. | |
| 2011/0041781 A1 | 2/2011 | Deivasigamani et al. | |
| 2011/0041833 A1 * | 2/2011 | Blevins | F24D 5/005 126/585 |
| 2011/0058795 A1 | 3/2011 | Kleman et al. | |
| 2011/0114477 A1 | 5/2011 | Sinha | |
| 2011/0123179 A1 | 5/2011 | Roetker et al. | |
| 2011/0135289 A1 | 6/2011 | Kayser | |
| 2011/0139144 A1 | 6/2011 | Zheng | |
| 2011/0146665 A1 | 6/2011 | Scharfe | |
| 2011/0184585 A1 | 7/2011 | Matsuda et al. | |
| 2011/0277744 A1 | 11/2011 | Gordon et al. | |
| 2011/0305444 A1 | 12/2011 | Pussell | |
| 2012/0017886 A1 | 1/2012 | Gordon et al. | |
| 2012/0024372 A1 | 2/2012 | Delgado | |
| 2012/0060827 A1 | 3/2012 | Roetker | |
| 2012/0060829 A1 | 3/2012 | Duplessis et al. | |
| 2012/0078433 A1 * | 3/2012 | Honma | F24D 11/004 700/295 |
| 2012/0210999 A1 | 8/2012 | Straeter | |
| 2012/0242148 A1 | 9/2012 | Galati | |
| 2012/0279493 A1 | 11/2012 | Dotan | |
| 2012/0308217 A1 | 12/2012 | Wiedlroither | |
| 2013/0263843 A1 | 10/2013 | Kreutzman | |
| 2013/0266295 A1 | 10/2013 | Kreutzman | |
| 2013/0266296 A1 | 10/2013 | Kreutzman | |
| 2013/0266300 A1 | 10/2013 | Kreutzman | |
| 2014/0010522 A1 | 1/2014 | Van Der Heijden et al. | |
| 2014/0112647 A1 | 4/2014 | Lichtenberger | |
| 2014/0153913 A1 | 6/2014 | Newman et al. | |

* cited by examiner

RENEWABLE ENERGY HOT WATER HEATER WITH HEAT PUMP

CROSS REFERENCE

This application is a Continuation-In-Part of U.S. patent application Ser. No. 14/549,723 having a filing date of Nov. 21, 2014, which is a continuation of U.S. patent application Ser. No. 13/442,753 having a filing date of Apr. 9, 2012 and which issued as U.S. Pat. No. 8,909,033, this application is also a Continuation-In-Part of U.S. patent application Ser. No. 13/829,320 having a filing date of Mar. 14, 2014, the entire contents of all of these applications are incorporated herein by reference;

FIELD

Systems and methods (i.e., utilities) disclosed herein are directed to improvements to renewable energy hot water heating for residential and commercial applications.

BACKGROUND

Photovoltaic systems (PV system) utilize solar panels to convert sunlight into electricity. A typical system is made up of one or more solar photovoltaic (PV) panels, a racking system that holds the solar panels, electrical interconnections, and control components. The PV system generally provides electrical energy to a residential or commercial building.

A grid connected or grid-tied PV system is connected to a larger independent grid (typically the utility power grid) and often feed generated electrical power directly into the grid though a portion or all of the generated electrical power may be utilized by the residential or commercial building before being fed to the larger grid. Any excess electrical power fed to the grid may be credited to the owner of the PV system. That is, the feedback is done through a meter to monitor power transferred. Feeding the excess electricity into the grid requires the transformation of DC electricity generated by the PV panels into AC electricity by a special synchronizing grid-tie inverter. The grid-tie inverter converts DC electricity into AC electricity that is matched in phase and frequency with the AC electricity of the utility power grid prior to being fed into the utility power grid. Grid-interactive inverters typically cannot be used in stand-alone applications where utility power is not available. In this regard, such grid tie inverters require a reference voltage/current from the utility power grid to operate. Grid-tie inverters are also designed to quickly disconnect from the utility power grid if the utility power grid goes down. This disconnect functionality ensures that, in the event of the utility power grid going down (e.g., blackout), the grid tie inverter will shut down to prevent the energy it produces from being fed into the grid which may result in an islanding condition that may potentially harm any line workers who are sent to fix the utility power grid. Stated otherwise, when the utility power grid goes down, grid tied PV systems shut down. However, the use of grid tied system enables use of a PV system without extensive rewiring and without batteries.

Standalone systems do not have a connection to a utility power grid. In stand-alone photovoltaic power systems, the electrical power produced by the photovoltaic panels cannot always be used directly. More typically, all generated electrical power is utilized to charge a battery bank and application loads are connected to the battery bank.

Each of the systems has certain benefits and drawbacks. For instance, grid tied systems avoid the use of costly batteries but, due to the requirement that they shut down if the utility power grid goes out, do not provide energy during utility power loss. Standalone systems can be significantly simplified in relation to the grid-tied systems due to the elimination of synchronizing inverters and other components but require the use of costly battery banks.

In household and commercial usage, most hot water heaters in North America, as well as numerous other countries, are of a storage type. Such storage type water heaters typically include a cylindrical vessel/container (i.e., tank) in which water is kept continuously hot and ready for use. Typical sizes for household use range from about 20 to 120 U.S. gallons. Water heaters for commercial applications are often much larger. Heating the water in the tank is typically affected by way of electrical heating elements or fossil fuel burners (e.g., natural gas, propane, fuel oil, bio mass, etc.) burners. Often, the source of the energy for heating is a local utility.

In most hot water heaters, water is introduced into the storage tank via a water supply inlet pipe. Water typically enters residences in the US at about 50° F. though this varies with latitude of the residence and the season. An electrical element within the tank or a burner disposed beneath the tank is selectively operated to heat the water within the tank to a preset temperature. For instance, hot water temperatures of 105-120° F. are typically preferred for residential applications. Operation of the element or burner is controlled by a thermostat that monitors/measures the temperature within the tank. When the water within the tank is below a desired temperature, the electrical element is energized or the burner is ignited to heat the tank and the water therein.

Energy efficiencies of water heaters in residential use can vary greatly based on manufacturer, model and/or age. Gas fired water heaters typically have efficiencies of between about 55% and 95%. Electric water heaters have high efficiencies (e.g., above 95%) once the electricity enters the home but are more costly to operate due to electricity generation and transmission costs. In either case, a typical household expends roughly 30% of its total energy use heating water.

SUMMARY

Provided herein are various systems and methods (i.e., utilities) broadly directed to the generation of hot water using energy derived from renewable energy sources. In the various aspects, these utilities are directed to the retrofitting of existing water heaters with electrical heating elements that are connectable to a renewable source of electrical energy. While primarily discussed in relation to retrofitting existing water heaters, various aspects are applicable to OEM manufactured systems. Further, various control methods are provided that allow for enhancing the efficiency of hot water generation, net metering, and/or the generation of renewable energy credits.

In one aspect, a supplemental heating element is provided for use with a hot water heating system. In this aspect, the hot water heating system includes, a storage tank having an inlet that is fluidly connectable to a pressurized or gravity fed water supply and an outlet that is fluidly connectable to at least at least one valve or tap. When the valve or tap is opened, water from the water supply displaces water through the storage tank and out of the outlet. The storage tank is heated by a first heating element that is connectable to a first power source that provides power from one of fossil fuel (e.g., gas, bio mass, etc), AC electricity and/or existing solar or solar/thermal systems that are underperforming. Such power sources include utility sources and storage tanks (e.g., propane). A thermostat connected to the first heating element controls operation of the first heating element based at least in part on a temperature of water in the storage tank. The system further includes a second or supplemental heating element. The supplemental heating element includes a threaded collar for threaded insertion with a threaded opening of the storage tank. A supplemental electrical element is connected to an inside surface of the threaded collar such that when the threaded collar is threaded into the threaded opening, the supplemental electrical element is disposed within the storage tank. An electrical connector extends through the threaded collar to electrically connect the supplemental electrical element with a coupling or plug that is disposed on an outside surface of the storage tank when the threaded collar is in threaded engagement with the storage tank. Finally, the system includes a renewable power source electrically connected to the supplemental heating element. The renewable power source is typically an on-site source that provides electrical power to the supplemental heating element. On-site renewable generation depends on the renewable energy resources available at that site, e.g., solar, wind, hydro, geothermal, biomass, etc., and are not mutually exclusive. Any renewable power source that provides electrical energy may be utilized. Typically, the on-site renewable energy source provides a DC voltage, which may be inverted to an AC voltage prior to application to the supplemental heating element. However, in some arrangements, the renewable energy source may include direct AC generation (e.g., wind turbines).

To control the operation of the supplemental heater, the system may further include a temperature sensor that monitors the water temperature within the tank. In its simplest form, the controller is formed of a switch disposed between the renewable power source and the supplemental heating element. This switch opens upon the temperature sensor identifying a predetermined temperature within the tank. This predetermined temperature may be preset or selected by a user.

In various arrangements, the threaded collar is sized for threaded engagement with an inlet or outlet of the storage tank, a drain opening of the tank, or a pressure relief valve of the tank. In these arrangements, the threaded collar may further include a tubular body with a hollow interior to permit fluid flow though the collar. In this arrangement, the electrical connectors pass through a sidewall portion of the tubular body. It may be preferential that electrical conductors and other elements passing through a portion of a hollow interior of the tubular body have a combined cross-sectional area that is less than 40% of the cross-sectional area of the hollow interior of the tubular body to reduce flow impedance. In a further arrangement, the combined cross-sectional area is less than 20% of the cross-sectional area of the hollow interior.

In one arrangement, the threaded collar includes first and second heating elements that may be connected to first and second power sources. For instance, the first heating element may be connected to a renewable power source and the second heating element may be connected to a utility power source (e.g., an AC source).

The controller, as noted above, may be included to control the operation of the system. In this regard, the controller may be connected to and control operation of the first heating element and the supplemental heating element. In this regard, the controller selectively operates the heating elements. To affect such control, the controller may further include operating logic adapted to identify expected usage times when water passes through the tank between the inlet and the outlet. Accordingly, the controller may control the heating elements based at least in part on the usage times. For instance, the controller may operate the supplemental heating element when a temperature of the tank is below a predetermined threshold level if power is being received from the renewable power source. That is, the controller may deactivate the first heating element and rely on the supplemental heating element. Further, the controller may deactivate the first heating element if a next expected usage time is more than a predetermined time away. Such predetermined time may be determined from usage patterns or via user inputs. In various arrangements, the first heating element is an electrical element that is connected to an AC utility provider. In another arrangement, the first heating element is a gas burner. The controller may further include a network interface to allow sending or receiving information or instructions to an outside platform. In such an arrangement, a third party (e.g., utility, device manufacturer, device installer, etc) may control one or more operations of the system. For instance, a utility or other third party may remotely command the controller to deactivate the first heating element. Further the controller may identify and/or report an amount of power received from the renewable power source. For instance, the controller may be in data communication with a third party and the controller may report power received from the renewable power source to the third party who may use this information to generate RECs. In a further arrangement, the controller may include a maximum power point tracking (MPPT) module for controlling power output of the photovoltaic array. Likewise, the controller may alter the configuration of a PV array (e.g., series, parallel) to enhance power output.

The utility may further comprise connecting a controller between the electrical heating element and the renewable energy source, where the controller is operative to connect and disconnect the renewable power source and the electrical heating element. The controller may also be connected to a utility that is connected to a standard heating element of the water heater. In this arrangement, the controller is operative to selectively operate the electrical heating element and the utility connected heating element. That is, the controller may selectively deactivate the utility connected heater element. Such deactivation may occur when electrical energy from the renewable energy source is above a predetermined level or according to a predetermined schedule, which may be user specified or generated based on historic usage patterns.

In a further aspect, a utility is provided for use with a hot water heater having a first heating element connected to a utility power source and a second heating element connected to a renewable energy source. The utility includes providing a controller connected to the first heating element and the second heating element where the controller is operative to execute logic to determine an amount of energy generated by the renewable heating element. The controller is then operative to report the amount of energy generated to a third party via an input/output interface. The third party may then bundle the amount of energy produced with amounts from other hot water heaters connected to renewable energy sources to generate RECs.

In another aspect, a utility is provided for use with a hot water heater having a first heating element connected to a utility power source and a second heating element connected to a renewable energy source. The utility includes providing a controller interconnected to the first heating element and the second heating element, where the controller is operative to execute logic to selectively operate the first and second element. The controller operates the second heating element when a temperature of water in a tank of the hot water heater is below a predetermined threshold level. The controller also deactivates the first heating element when the electrical energy from the renewable energy source is above a predetermined level or when a command is received to deactivate the first heating element from an input interface.

Such commands may be received from a user interface or from a utility provider via a data interface. Likewise, the controller may be operative to divert electrical energy from the second heating element into an electrical grid upon one of, for example, the water reaching a predetermined threshold temperature or receiving a diversion command from a utility provider via the data interface.

According to a further aspect, a method is provided for interconnecting a single electrical heating element of a hot water heater to first and second electrical power sources. Typically, these first and second electrical power sources include a utility provided electrical power source (e.g., a fossil fuel AC power source) and a renewable energy power source. The method includes operating a controller that selectively operates a first and second power sources. In this regard, if sufficient electrical power is available from the renewable energy power source, the utility provided electrical power source may be disconnected to preferentially utilize renewable energy. Alternatively, energy from both sources may be simultaneously applied to the single electrical heating element. In such an arrangement, the controller may further include an inverter (integrated therein, mounted on the panels, or otherwise disposed between the renewable energy source and the heating element) that matches the phase of the renewable power with the phase of the utility provided power. In an arrangement including an inverter, power may be fed from the renewable energy source back into the utility grid. Such power may be directed through the heating element.

According to another aspect, a utility is provided that allows for dynamically allocating electrical power received from a renewable energy source (e.g., PV system, wind-turbine, etc.). Interconnected to one electrical outlet of a switching circuit is a resistive load that is adapted to convert electrical power to thermal energy. For instance, such a resistive load may be formed of a heating element that may be utilized to heat various media (e.g., water, air, etc.). Generally, the resistive load acts as a sink for the utility allowing for utilization of all or a portion of the electrical power generated by the renewable energy system. In this regard, all electrical energy may be utilized such that a battery bank is not required for storage of electrical energy from the renewable energy system. In this regard, the utility may operate without tying to a utility power grid or the use of storage batteries. Also interconnected to the switching circuit via a second electrical output is at least one additional electrical application load. Such an electrical application load may be any application that utilizes electrical power. The utility further includes a controller that supports control logic that is adapted to allocate the electrical power between the electrical application load and resistive load. In this regard, the controller is operative to generate control signals that are received by the switching circuit that variously connects the electrical power to the electrical application loads and/or the resistive loads in accordance with the control signals. Typically, the controller will be operative to identify a current power capacity of the renewable energy source such that the power may be allocated between the electrical loads the resistive load.

In one arrangement, the controller is operative to apply electrical power from the renewable energy source in order to maximize the output thereof. For instance, in the case of a PV renewable energy source, it may be desirable to perform MPPT functionality in order to maximize the power output of the PV array. As will be appreciated, maximizing the power output of such a PV array requires balancing the total loads on the PV array with the capacity of the array. Accordingly, the controller may be operative to identify the electrical load requirements of one or more electrical application loads interconnected to the switching circuit. Once the load requirements are identified for one or more electrical application loads, the controller may interconnect loads for which sufficient power is available to the renewable energy source. At this time, any remaining electrical power may be directed to the resistive element. As will be appreciated, this allows for utilizing all electrical power produced by the renewable energy source free of storage of any power to the battery system or diversion of any excess power to an electrical power grid. In another arrangement, constant voltage MPPT tracking may be implemented. In such an arrangement, rather than maximizing the output of the PV array, the MPPT functionality may be utilized to maintain a desired voltage. In such an arrangement, the resistance of panel mounted devices (e.g., micro-inverters) and/or resistive elements may be adjusted to maintain a desired voltage from the PV panel. Such a voltage may be user selectable within a range of voltages provided by the PV panel.

In one arrangement, the utility is a PV system that utilizes DC power received from a PV array. In such an arrangement, MPPT algorithms may be implemented in order to enhance the power output of the array. In another arrangement, the utility utilizes a PV array that is adapted to provide AC power. In such an arrangement, each panel in the PV array may include a micro-inverter that is adapted to generate AC power at the panel. In order to utilize AC power free of tying to a utility power grid, it may be necessary to generate a reference signal (e.g., non-grid reference signal) for receipt by the micro-inverters such that they may generate electrical power in accordance with predetermined characteristics of the non-grid reference signal. In one arrangement, such a non-grid reference signal is generated by the controller and provided to the micro-inverters of the array. In another arrangement, one of the micro-inverters of the array generates a non-grid reference signal and the non-grid reference signal is provided to the remainder of the panels of the array. Such an arrangement allows for utilizing micro-inverters free of utility grid tying. In such an arrangement, any anti-islanding functionality may be removed from the micro-inverters.

In one arrangement, the utility allows for allocating electrical power between different applications. Accordingly, an owner of the system may direct where the electrical power is utilized. In this regard, the controller may allow for user inputs to identify the priority of the electrical applications. Further, if no electrical applications are currently active, the system may be operative to apply all electrical power to the resistive element to provide thermal energy. In one arrangement, such thermal energy is utilized to heat water in a hot water heating system.

In a further arrangement, a hot water heating utility is provided that utilizes a renewable energy powered heat pump to heat water in a water heater or other water storage tank (e.g., swimming pool). In the hot water heater embodiment, the utility includes a tank having a water inlet and outlet. The tank includes at least a first heating element for supplying thermal energy to water within the tank. Incorporated with the hot water heater is a heat pump having a compressor and an evaporator. The heat pump also includes a condenser coil that is disposed within the tank. Typically, the heat pump will also include a fan and an expansion device/valve. A controller is connected to a renewable energy source (e.g., PV array, wind turbine). This controller is operative to selectively connect the heat pump to electrical power from the renewable energy source. In one arrangement, the first heating element is an electrical heating element that is also connectable to the electrical power from the renewable energy source. In such an arrangement, the controller is operative to selectively operate the heat pump and the electrical heating element based on one or both an ambient temperature outside the tank and a level of electrical power available from the renewable energy source. In another arrangement, the heating element is a utility powered heating element. In such an arrangement, the controller is operative to activate and deactivate the utility powered heating element based on the electrical power available from the renewable energy source and/or the ambient temperature. In a further arrangement, the heat pump control system dynamically allocates electricity between one or more electrical loads (e.g., electrical loads connected to electrical outlets of the controller) and the heat pump and/or electrical heating element.

It will be appreciated that elements of the various aspects may be incorporated into one another without limitation and as further discussed herein.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions.

Figure 1:
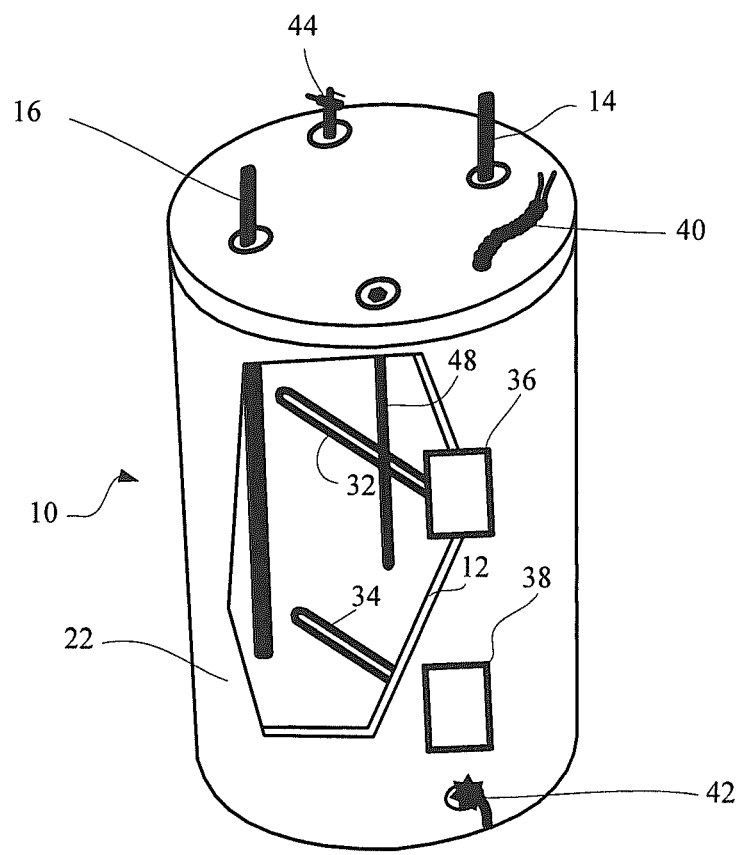
FIG. 1 illustrates an exemplary electrical hot water heater.

FIG. 1 illustrates one exemplary embodiment of a hot water heater 10 that may be utilized to heat water for residential and/or commercial applications. A portion of the sidewall is cut away to illustrate the internal components of the hot water heater. As shown, the hot water heater 10 is an electrical hot water heater that utilizes first and second electrical heating elements 32, 34 as a heat source for heating water within a storage tank 12. The elements are controlled by a thermostat (not shown), which activates the elements (e.g., completes a circuit) when a temperature within the tank 12 drops below a predetermined temperature. Typically, the tank 12 is disposed within an outer casing 22 that surrounds the tank. Insulation typically fills the space between the outer casing 22 and the tank 12.

In the present embodiment, both elements 32, 34 are disposed through threaded access openings (not shown) extending through the side of the tank 12. The elements 32, 34 are connected to an electrical conduit 40 which is connectable to an AC power source (e.g., 220 v). In this regard, external electrical connectors of the elements are interconnected to wiring of the conduit 40. This wiring extends between the tank 12 and casing 22. As shown, the external potions of these elements 32, 34 are covered by first and second plates 36, 38.

The cold water inlet 16 and hot water outlet 14 are threaded into threaded couplings apertures or orifices in the tank. The external end of the inlet pipe is connected (e.g., soldered) to a water supply pipe (not shown). The external end of the outlet pipe is connected to the plumbing that connects to hot water taps in the house (or other structure). The tank 12 stores heated water until a user opens a tap, which allows water to exit from the top of the hot water heater 10 through a hot water outlet 14. In conjunction with the water exiting the tank 12, water is introduced into the hot water heater via a cold water supply inlet 16. More specifically, the pressure of the inlet water is used to displace the hot water through the outlet 14 and downstream piping when a tap opens. Most commonly, the supply water inlet 16 extends into the tank to a location near the bottom of the tank 12. This partially isolates the inlet water from hot water within the tank, which rises to the top of the tank 12.

In addition to the openings in the tank for the inlet and outlet pipes, the hot water heater has several other access points or orifices. These orifices include a drain 42 disposed at or near the bottom of the tank 12. This drain includes a valve for use in draining/cleaning the tank. The hot water heater typically also includes a pressure relief valve 44 at or near the top of the tank 12. This valve 44 opens if the pressure in the tank exceeds a predetermined threshold. In this regard, if the water in the tank overheats, the valve is operative to open and relieve excess pressure. Also included in the tank is an anode rod 48 that extends through the tank 12. The location and design of the anode rod varies. However, the purpose of any anode rod is to preferentially corrode to prevent corrosion of the tank. Such anodes may be powered or passive.

Figure 2:
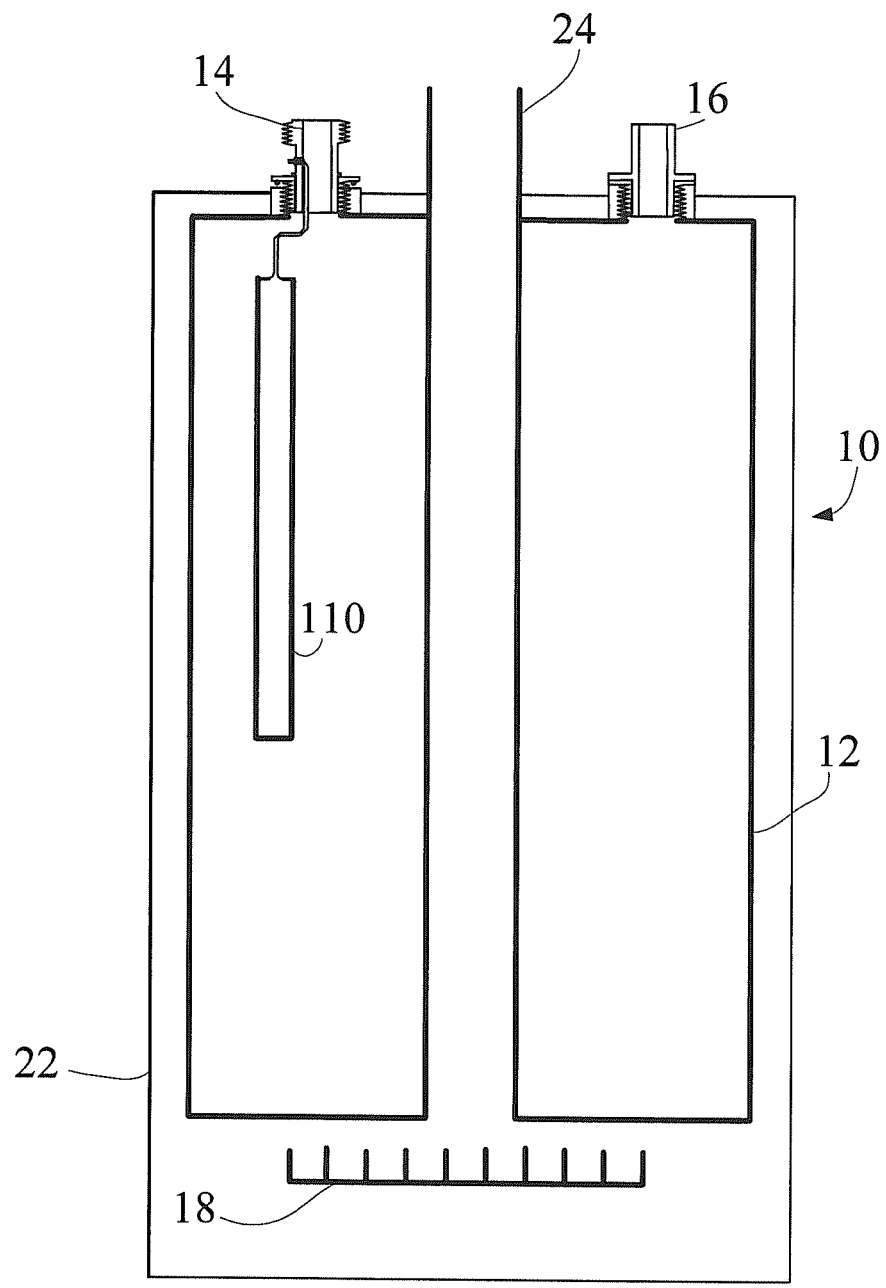
FIG. 2 illustrates an exemplary gas hot water heater including a supplemental heating element.

FIG. 2 illustrates a side cross-sectional view of a gas fired hot water heater. Like components have the same numbering as the hot water heater of FIG. 1. The gas fired water heater includes a burner 18 disposed below the tank 12, which is controlled by a thermostat, that ignites when a temperature within the tank 12 drops below a predetermined temperature. The burner 18 may further include a standing pilot light, piezoelectric ignition system or other ignition system. Extending from above the burner 18 and through the center of the tank 12 is an exhaust gas chimney or internal flue 24. This internal flue 24 vents the combusted burner gases to an outside vent. In this regard, the internal flue 24 is typically interconnected to an external flue pipe (not shown) that extends from the hot water heater to an outdoor location to safely vent the combusted gases. It will be appreciated that the hot water heater may include various other components including, for example and without limitation, a pressure relief valve, drain valves, anodes, etc. Further, either of the exemplary water heaters of FIGS. 1 and 2 may be differently configured. For instance, the inlet and outlet pipes may enter and exit through, for example, side surfaces of the tank.

Aspects of the present disclosure are based on the realization by the inventor that various access points exist into most water heater systems. That is, most water heaters include water inlets and outlets, drains, pressure relief, recirculation, and/or anode rod access points. Accordingly, the present inventor has recognized that any of these access points may be utilized to insert a supplementary heating element into the water heater. The size and configuration of the heating element may be adapted to the particular access point for which it is designed. In any embodiment, a second heating element may be inserted into the water heater, in addition to or in conjunction with an existing heating element (e.g. electric element or gas burner), to improve the efficiency thereof. More specifically, such a supplementary heating element may be powered by a renewable power source (AC or DC) such that heat applied to the storage tank of the water heater may originate from, for example, a wind turbine or photovoltaic solar array.

Figure 3:
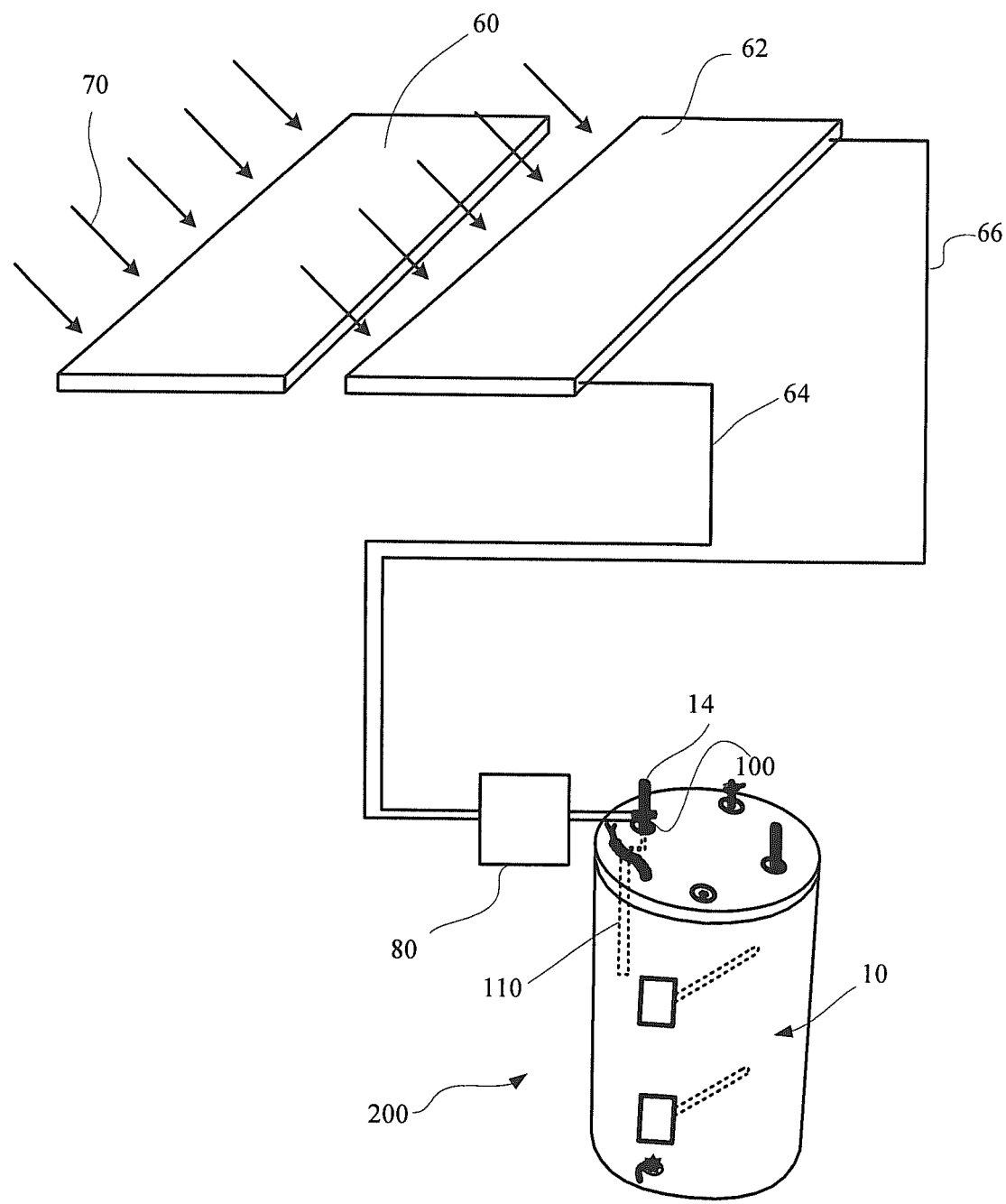
FIG. 3 illustrates an exemplary electrical hot water heater including a supplemental heating element that is connected to a renewable energy source.

One exemplary system in accordance with various aspects of the presented inventions is illustrated in FIG. 3. In this embodiment, first and second solar arrays 60, 62 are interconnected in series or parallel (as to be further discussed herein) in order to provide DC power (or AC power if an inverter is utilized) to a supplementary heating assembly 100 that may be retrofit into an existing water heater. In the present embodiment, the supplementary water heating assembly 100 is inserted into the hot water outlet 14 of the water heater 10. In one configuration, the heating element 110 of the supplementary heating assembly 100 is an element that is operative to generate heat in response to either an applied DC or AC current. In another embodiment, the element 110 may be a DC element. The inclusion of this heating element 110 into the hot water heater 10 allows for the direct application of DC voltage from a renewable energy such as PV arrays 60, 62 to the element 110, which heats the water in the tank 12 of the hot water heater 10. In this regard, no inverter is required to convert the DC power from the PV arrays 60, 62 into an AC current to generate supplemental heat for the hot water heater 10. Further, the heating element 110 is operative to provide heat to the tank of the hot water heater 10 in response to any applied voltage. Even in instances of low light, voltage will be generated by the PV arrays and result in a current in the heating element and the addition of heat to the water in the hot water heater 10. It will be appreciated that low light PV panels may be utilized that allow conversion of indoor ambient light into DC power (or AC power if an inverter is utilized). Such panels may allow for indoor mounting in, for example, industrial applications such that interior light may provide the light to initiate the photovoltaic effect of the PV panels. Other PV sources may include sources that generate DC power from parasitic light conditions. For instance, and not by way of limitation, such sources include paint, organic cells and building integrated photovoltaic (BIPV) applications.

In operation, the heating element 110 will necessarily be at the temperature of the water within the storage tank 12 of the hot water heater 10 and any energy passing through the element 110 will result in the addition of heat energy to the water within the tank 12. That is, the present system begins adding energy as soon as the PV arrays 60, 62 begin generating any voltage.

Such a system has significant benefits in relation to a solar thermal system that introduce heated fluids into a heat exchanger in the water heater. In such solar thermal systems, collector panels typically heat a working fluid (e.g., liquefied salts, glycols, etc.) to a predetermined temperature and then a pump operates to circulate the fluids through the heat exchanger in the hot water heater. The working fluid within the collector panel is not circulated until the predetermined temperature is attained. Stated otherwise, the temperature of the working fluid has to be higher than the temperature of the water in the water heater to provide a large enough temperature difference (i.e., delta) between the working fluid and the water to effectively transfer heat there between. In this regard, such solar thermal systems have limited operating periods throughout the day. Furthermore, once the water in the tank of the water heater reaches a predetermined maximum temperature, such solar thermal systems must exhaust heat in the working fluid to another heat sink in order to prevent the working fluid from becoming overheated, which may damage the system. Alternatively, such systems may include a drain-back system to address overheating issues. Accordingly, such systems typically require complex plumbing, an electrical pump, and a liquid to liquid heat exchanger that allows for providing heat to the hot water heater 10. Such solar thermal hot water heating systems also require specially designed tanks in order to allow exchange of heat from the collector panels and the water within the tank. In this regard, the overall system discussed herein is simplified in relation to previous systems.

As shown in FIG. 3, radiation 70 from the sun is received on the photovoltaic arrays 60, 62. These arrays 60, 62 generate DC electrical power responsive to the solar radiation 70. The photovoltaic arrays include a large number of generally conventional photovoltaic cells, as well understood by those in the art. The present system utilizes the DC power from the arrays that, in one embodiment, is applied directly to an electrical heating element 110 disposed within the tank. The element 110 is initially at the temperature of the water in the tank and therefore any current passing through the element raises its temperature and thereby heats the water in the tank. All that is required to interconnect the heating element 110 to the solar array 60, 62 are first and second electrical leads 64, 66. Though shown as separate leads, these leads, 64, 66 may be disposed in a common electrical cable (i.e., having two conductors and in some instances a ground wire) such that a single cable needs to be run from the PV array 60, 62 and simply plugged into the supplemental heat assembly 100. The ends of these leads 64, 66 may be wired with a plug that allows for simply plugging the array into a controller or directly to the heating element, either of which may have a mating plug (e.g., 3 prong with ground, etc.). In further embodiments discussed herein, the system may include additional control devices.

Figure 4A:
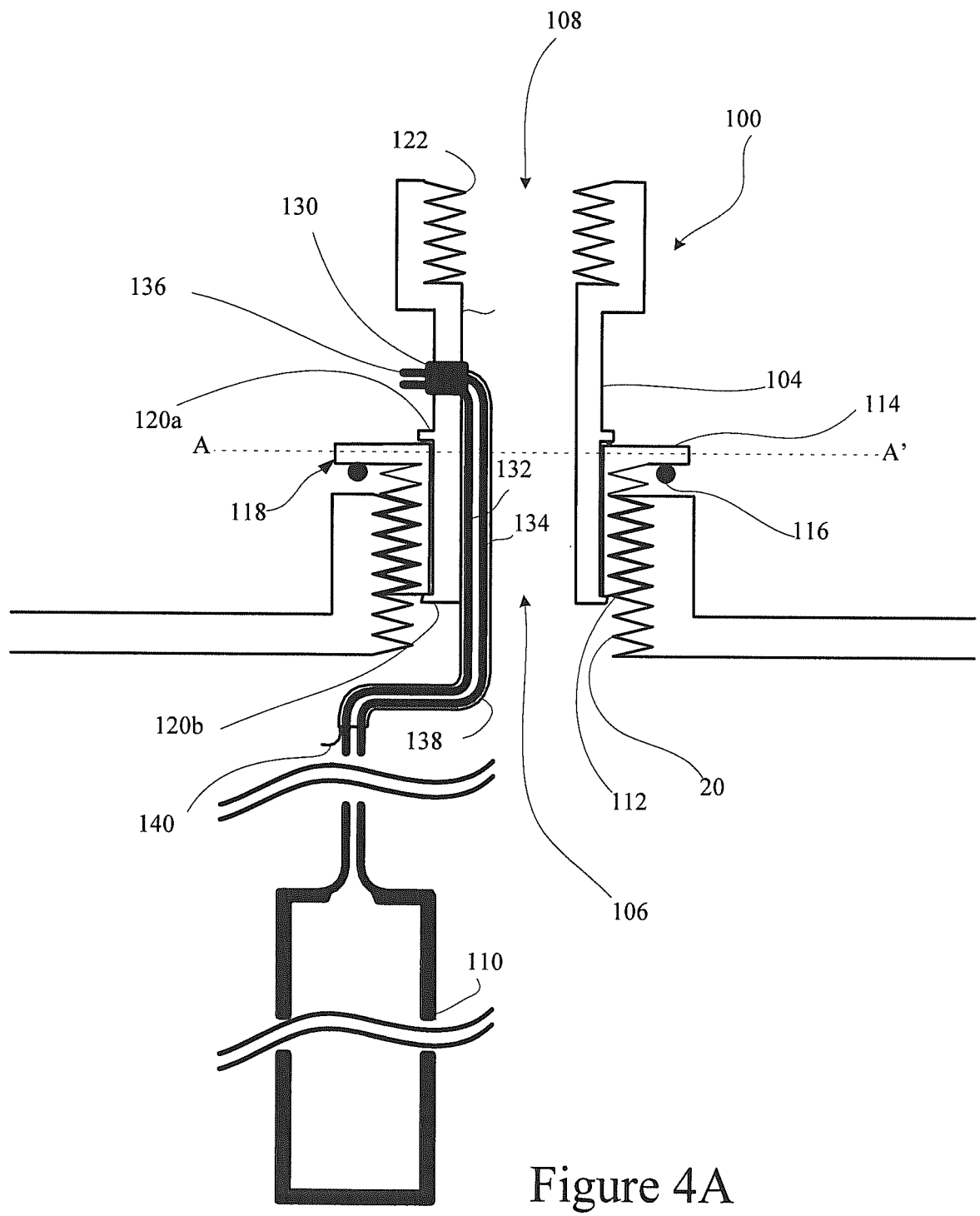
FIG. 4A illustrates one embodiment of a supplemental heating element.

FIG. 4A illustrates one embodiment of the supplemental heating assembly 100. In the illustrated embodiment, the assembly 100 is adapted for insertion into the inlet or outlet port of a hot water heater. However, it will be appreciated that other embodiments may be adapted for insertion into a pressure relief valve opening, a drain valve opening, circulation port, an anode opening and/or a combination thereof. Accordingly, the following description is by way of example and not by way of limitation. As shown, the assembly 100 includes a tubular member 104 that is adapted for threaded insertion into mating threads 20 of an opening within a water heater to support an electrical element 110 within the tank. The size and configuration of the electrical element 110 may be selected based on the size of the tank, power rating of the renewable energy source etc. The tubular member 104 has a first open end 106 and a second open end 108 that define a fluid passageway there through. In this regard, the tubular member may be inserted into an opening within a water heater while still providing a flow path into or out of the water heater.

As shown, an insertion end of the tubular member 104 has a first set of threads 112 that are sized for mating engagement with the threads 20 of the water heater opening. The top end of these threads 112 includes a flange 114 that extends over the top surface of the threaded opening. Disposed beneath this flange for compression against the top surface of the threaded opening is a seal member 116. However, it will be appreciated in other embodiments the first set of threads need not necessarily have a flange or a seal member. That is, the threads may provide an adequate seal. In any case, when the first set of threads 112 are inserted into the threads 20 of the opening, the tubular member 104 forms a fluid tight seal with the opening within the water heater 10. In the present embodiment, the first set of threads 112 are formed on an outside surface of the tubular member 104 near the first open end 106.

In the present embodiment, the threads are formed on a flare nut 118. This flare nut 118 allows for the first set of threads 112 to rotate free of rotation of the tubular member 104. In such an arrangement, the flare nut 118 may be interconnected to the tubular member 104 via first and second annuluses 120A, 120B formed on the outside surface of the tubular member. The use of the flare nut 118 allows for positioning an offset heater element 110 within a tank of a water heater at a desired location and subsequent tightening of the flare nut 118 to maintain the heater element 110 at the desired location. However, it will be appreciated that in other embodiments, the threads 112 on the insertion end of the tubular member 104, may be integrally formed on the inside surface thereof.

In the present embodiment, the tubular member 104 also includes a second set of threads 122 disposed proximate to the second open end 108. The second set of threads 122 allows for interconnecting the outlet end of the tubular member 104 to incoming or outgoing pipes, as the case may be. Though illustrated as having a second set of threads 122, it will be appreciated that other embodiments of the assembly 100 may have a second 'stub end' that is adapted for soldering or other connection to an inlet or outlet pipe. Though illustrated as a generally cylindrical tube, it will be appreciated that the tubular member 104 need not be straight. In this regard, the first and second open ends may be offset from one another and the tubular member 104 may have one or more bends therein.

Disposed through a side wall 102 of the tubular member 104 is a fluid type grommet or coupling 130. This coupling 130 provides a passageway through the sidewall 102 that allows first and second electrical leads 132, 134 to extend through the sidewall 102 and pass through the first open end 106 of the tubular member 104. These leads 132, 134 have a first end that is electrically connected to the heater element 110. Second ends of the electrical leads 132, 134 extend through the coupling 130 and terminate in an electrical coupler 136. This coupler 136 may be formed as an electrical plug that allows for direct interconnection to the electrical lead extending from the PV arrays (See for instance FIG. 3) or a controller.

In the present embodiment, the first and second electrical leads 132, 134 are encased within a conduit 138 that extends from the coupler 130 through the first open end 106 of the tubular member and partway into the tank of the water heater 10. This conduit 138 may be interconnected to the inside surface of the tubular member 104. In one arrangement, the conduit is thin walled metallic tube that may be adhered or otherwise attached (e.g., soldered, welded etc.) to the inside surface of the tubular member 104. In this regard, the conduit 138 may have a rigidity that is in excess of the rigidity of first and second electrical leads 132, 134. The rigidity of the conduit 138 may provide structure that allows for offsetting the electrical element 110 from, for example, a centerline axis of the tubular member 104. In this regard, it may be beneficial to offset the electrical element 110 in order to selectively position the electrical element 110 within the tank of the water heater at a position that does not interfere with, for example, other electrical heating elements, anode rods etc. However, in other embodiments, the electrical coupling element 110 may be interconnected to the tubular member by another means such as a tensile member (e.g., cable, wire, etc.).

In the present embodiment, in addition to providing access for the electrical leads 132, 134 the coupler 130 and conduit 138 also provide a passageway for a temperature sensor 140. This temperature sensor 140 may be any sensor that provides an indication of the temperature of the water within the tank. Non-limiting examples include thermocouples and thermistors. This temperature sensor may be interconnected to a controller 80 that is located outside of the water heater. See FIG. 3.

In its simplest form, the controller 80 may be a switch, relay or other circuit interrupting/breaking device that allows for generating an open circuit upon the water temperature within the tank 12 reaching a predetermined threshold. Creation of such an open circuit prevents power passing through the electrical element 110 and thereby prevents the introduction of additional heat, once the water heater reaches a desired temperature. As will be appreciated, by opening the circuit formed by the PV arrays, electrical leads 64, 66 and heater element 110, electricity generated by the PV arrays, 60, 62 cannot flow through the electrical element 110. However, unlike solar thermal systems that require continued pumping to prevent overheating of a working fluid, the simple opening of the electrical circuit renders the PV arrays inactive. That is, no additional remedial steps need to be taken once the circuit is open. However, power from the PV array remains available and may be applied to other uses or converted to AC energy and returned to the grid. Likewise, power from the PV array may be reapplied to the element 110 upon the temperature therein dropping below the desired temperature. In a further embodiment, as discussed herein, the controller may provide additional functionality for the system. However, in its simplest form the controller simply opens and closes the circuit between the PV arrays and the heating element once the temperature reaches a desired threshold.

Figure 4B:
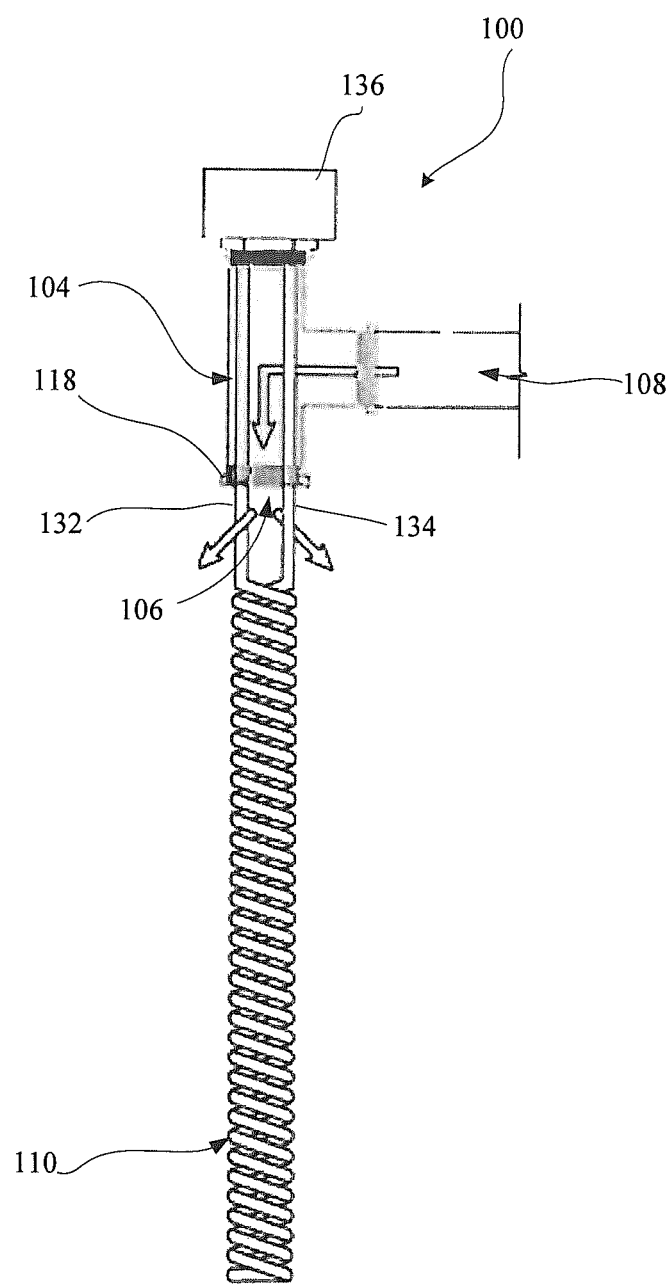
FIG. 4B illustrates another embodiment of a supplemental heating element.

FIG. 4B illustrates a further embodiment of a supplemental heating assembly 100. In contrast to the assembly of FIG. 4A, this assembly utilized a T-shaped tubular member 104.

In this arrangement, one of the 'legs' of the T shaped member forms in the first open end 106 and a second leg forms the second open end 108. The third leg provides a sealed access port for the leads 132, 134 which connect the heating element 110 to the electrical coupler 136. In this embodiment, the heating element 110 is illustrated as a coiled element to increase its effective surface area. Such an arrangement may be utilized with all heating elements discussed herein, though it is not a requirement. However, the sizing of the element is generally dictated by its surface area and use of a coiled element allows for increasing the surface area of the element in a space effective manner.

The ability to insert the heating assembly 100 into an existing water tank allows for retrofitting an existing water tank to utilize renewable energy. In this regard, it has been recognized that almost 30% of a typical household's energy use is consumed by heating water. The ability to retrofit an existing hot water heater with the heating assembly may significantly reduce the energy demands of an average household.

Outfitting existing or new gas water heaters with an electric element powered by local renewable energy sources allows this particular type of water tank to become very efficient. Further, gas water heaters can easily be retrofitted with this device. Given the fact that most gas powered hot water heaters utilize internal combustion originating from the bottom to middle of the tank, the ability to place an electric element in the upper portion of the tank allows both types of energy to be utilized separately, simultaneously or in conjunction with one another for optimum efficiency with minimal control. This could be needed due to time demands placed upon the fossil fuel resource by the provider or utility or by the occupant for the time of demand. For example, a common fired gas water heater with a DC or AC element powered by on-site PV, wind turbine or other renewable source, allows the gas system to work only when the upper element cannot provide sufficient energy due to lack of wind, irradiance, etc. This allows the system to function extremely efficiently as usage dictates and supply by renewable energy allows. This is due to the fact that the electric element in the upper portion of the tank and will allow the upper tank to be heated first, and the sensor controlling the gas water heating is typically in the upper portion of the tank thus will not fire the gas system unless the demand exceeds the renewable resources available. This also allows a builder or owner to simply pre-wire for solar water heating at the time of tank installation for relatively little cost. Though shown with an electrical element near the top of the tank both elements could be placed in the lower portion of the tank with a proper controller interfacing with the burner (gas) and electric element. This solves a particular difficult issue of how to get renewable energy into a gas/fuel oil fired water heater without interfering with the existing gas heating system. When retrofit into existing tanks or incorporated into new tanks, the element connected to the renewable source can be set to a higher temperature and the element or burner connected to a fossil fuel source (AC or gas) can be set at a lower temperature such that the renewable energy powered element operates preferentially to the fossil fuel powered element. This can also be the case to provide renewable energy to an instantaneous type water heater or condensing boiler for preheated water by renewable energy. This can be done by attaching a supplemental tank to the instantaneous water heater for "pre-feeding." The supplemental heating element may be utilized to control the operation of the gas burner with minimal or no integration of the controllers of the supplemental heating element and gas burner. For instance, if the supplemental element is set at a temperature above that of the gas burner (e.g., 150 F for the supplemental element and 120 F for the gas burner), the supplemental heating element will operate to heat the water to a temperature above the turn-off temperature of the gas burner. In this regard, the gas burner will cease operation and the supplemental element will continue to add heat energy to the tank. In operation, the gas burner will be on standby until the temperature of the tank falls below the gas burner set point (e.g., 120 F).

In a new water heater, it may be desirable to locate the supplemental electrical element in a lower portion of the tank so long as it does not interfere with the operation of the gas burner or its controls (e.g., thermostat). It will be appreciated that it is difficult for an electrical heating element to heat water that is at a location below the heating element due to stratification in the tank. Placing the supplemental heating element near the bottom of the tank allows the supplemental heating element to better heat a larger volume of water in the tank. Again, this allows controlling the gas burner with minimal controller integration. However, in a new (e.g., OEM) water heater with a gas burner and supplemental electrical heater (e.g., a hybrid water heater), the controls may be integrated and the burner and electrical heating elements may be placed anywhere. For example, such a hybrid water heater may have a mid-tank burner and an electrical element located near the bottom of the tank or both heating elements could be located near the bottom of the tank.

As noted above, power from the array 60, 62 or other renewable energy source is supplied to a controller 80 that controls the connection with the heating element 110 within a hot water heater 10. The controller 80 may comprise solid-state switches or relays controlled by switching signals in response to one or more sensors (e.g., temperature sensors). Further, the controller may be operative to affect the operation of the PV array in response to a radiation intensity signal from a photovoltaic sensor (not shown). Such a sensor may be a discrete sensor that is separate from the array(s) 60, 62. However, the power actually output by the arrays 60, 62 can also be measured, for example, with respect to a small number of the cells of the arrays 60, 62, and used as the radiation intensity signal provided to controller 80.

The ability to monitor the PV arrays allows for improving the efficiency of the array. In one arrangement, the controller includes a Maximum power point tracking (MPPT) module. MPPT is a technique that grid tie inverters, solar battery chargers and similar devices use to get the maximum possible power from one or more solar panels. As will be appreciated, solar cells have a complex relationship between solar irradiation, temperature and total resistance that produces a non-linear output efficiency known as an I-V curve. It is the purpose of the MPPT system to sample the output of the cells and apply the proper resistance (load) to obtain maximum power for any given environmental conditions.

Other components of the controller 80 are within the skill of the art and are within the scope of the present invention. For example, controller 80 might readily comprise an analog-to-digital converter for converting the signal proportional to the incident radiation provided by a sensor or PV panel to a digital value and a microprocessor or similar device for accordingly controlling one of the switches and/or heating elements. The controller 80 is also operative in some embodiments to reconfigure the photovoltaic array 60, 62 (by altering the connection of groups of cells from series to parallel, for example, and vice versa) so as to alter the power characteristics of the array.

Figure 5:
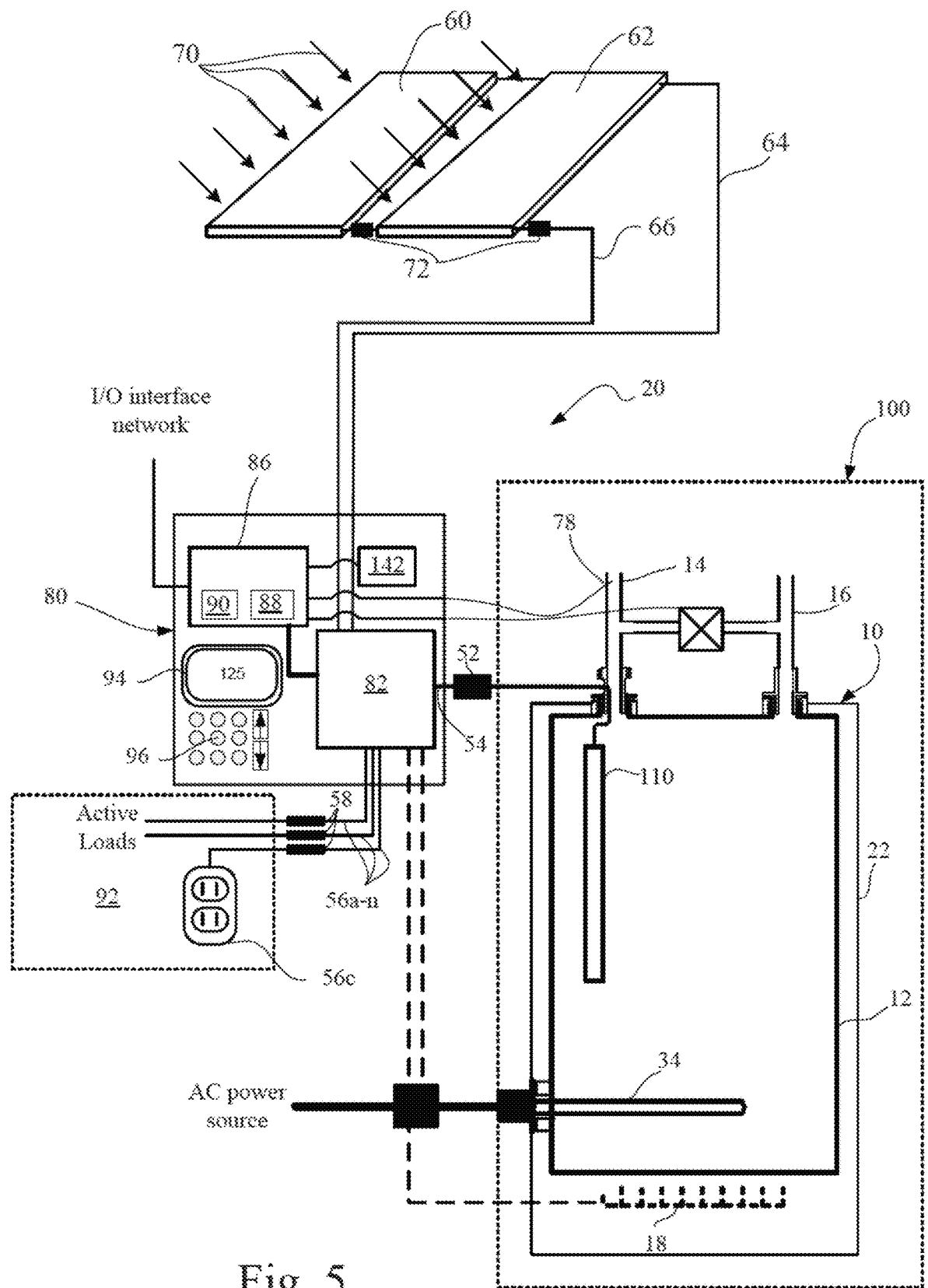
FIG. 5 illustrate one embodiment of a renewable hot water heating system.

FIG. 5 illustrates a PV system 200 in accordance with certain aspects of the presented inventions. Again, solar radiation 70 is received on photovoltaic arrays 60 which generate electrical power responsive to the solar radiation 70. The photovoltaic arrays include a large number of generally conventional photovoltaic cells, as well understood by those in the art. The present system 200 receives DC power or AC power from the arrays at a PV system controller 80 via a pair of electrical conductors 64, 66. The electrical conductors may be integrated into a common electrical cable (i.e., a two conductor cable). Further, the system may further incorporate a ground wire (not shown) that extends between the arrays 60 and the controller 80 (e.g., a three wire cable). Such a ground wire may be grounded to the electrical system of the structure incorporating the PV system 200 or may be directly grounded to a standard grounding rod.

In one optional embodiment, the PV system controller 80 is interconnected to one or more electrical application loads 92 (e.g., active loads such as lights, appliances, resistive heaters etc.) and at least one sink or resistive load 190 to which power received from the PV arrays 60 may be directly applied. In this exemplary embodiment, the resistive load 190 is a supplemental heating element 110 of a hot water heater 10. Instead of storing the power from the PV array to a battery bank, the controller 80 is operative to selectively and dynamically apply all or a portion of the electrical power to the active application loads 92 and/or directly the sink/resistive load 190 such that the power is converted to thermal energy. In instances where demand from active loads 92 connected to the controller 80 does not equal the solar array capacity, any excess power is directly applied to the resistive load 100 to balance the total load with the PV array capacity. For instance, maximum power point tracking may adjust the PV array operating point to the peak power point. In this regard, the maximum power output from the PV array may be utilized without requiring a battery for the PV system or tying the PV system to the grid. Further, the resistive load allows for absorbing spikes in the electrical power without damage to the active loads.

In one embodiment, the solar arrays 60 include one or more micro-inverters 72. In this regard, each panel may have its own micro-inverter or a micro-inverter may be provided for two or more (e.g., all) of the panels. In any arrangement, each micro-inverter 72 converts direct current (DC) electricity from a single solar panel to alternating current (AC) electricity. The electric power from several micro-inverters is combined and fed into the controller 80. Micro-inverters contrast with conventional string or central inverter devices, which are connected to multiple solar panels. Micro-inverters have several advantages over conventional central inverters. The main advantage is that even small amounts of shading, debris or snow on any one solar panel does not disproportionately reduce the output of an entire array. Each micro-inverter 72 may obtain optimum power by performing maximum power point tracking (MPPT) for its connected panel. MPPT is a technique that panel mounted micro-inverters use to get the maximum possible power from one or more solar panels. As will be appreciated, solar cells have a complex relationship between solar irradiation, temperature and total resistance that produces a non-linear output efficiency known as an I-V curve. The purpose of the MPPT functionality is to sample the output of the cells and apply the proper resistance (load) to obtain maximum power for any given environmental conditions.

Previously, each micro-inverter required a power utility grid input reference signal to operate. That is, previous micro-inverters are designed to match their outputs with utility grid power in order to feed power into the grid. In this regard, previous micro-inverters are designed to synchronize their frequency with that of the utility power grid (e.g. 50 or 60 Hz) using a local oscillator, which utilizes a reference signal from the utility power grid. That is, the micro-inverters have an on-board circuitry which will sense the current AC grid waveform, and generate an output voltage/current that corresponds with the utility grid power.

In order to provide a nongrid-tied PV system that utilizes individual micro-inverters with the PV panels in the array, in one embodiment the controller 80 generates a non-grid reference signal that allows the micro-inverters 72 to operate as if they were receiving a reference signal from a power utility grid. In this regard, the controller 80 may optionally include a small energy storage device 142 (e.g., battery) that is operative to generate the necessary reference signal that is provided to the micro-inverters 72. The battery 142, while being recharged by the PV array, does not store the energy from the array 60 in a magnitude to be considered a battery bank for the PV system. Rather, the on-board battery 142 stores sufficient energy to allow for the generation of the non-grid reference signal while the PV system is operating. Accordingly, the controller 80 may include an oscillator that is operative to utilize electrical energy from the on-board battery 142 to generate a non-grid reference signal having a required frequency, current and/or voltage to allow the micro-inverters 72 to match their output power to the non-grid reference signal. In another embodiment, one of the micro-inverters 72 generates the non-grid reference signal. In this embodiment, the micro-inverter that generates the non-grid reference signal (e.g., master micro-inverter) provides the non-grid reference signal to the remainder of the micro-inverters in the array (e.g., slave micro-inverters). The slave micro-inverters then utilize this reference signal to match their power output to the non-grid reference signal of the master micro-inverter. In either embodiment, what is important is that without a reference signal to synchronize to, the power output of the micro-inverters 72 may drift from the tolerances required by equipment (e.g., loads) connected to the controller. This concern is alleviated by the present system 200 by the generation of the non-grid reference signal by the controller 80 or a master micro-inverter.

Previous micro-inverters have also had anti-islanding protection in accordance with UL 1741. In the event of a power failure on the power utility grid, it is generally required that any grid-tie inverters attached to the grid turn off in a short period of time. This prevents the inverters from continuing to feed power into small sections of the grid known as "islands". Powered islands present a risk to workers who may expect the area to be unpowered. Anti-islanding protection functionality is removed from the micro-inverters 72 of the present system 200. As the PV system 200 in one embodiment forms it own micro-grid and is not connected to the utility power grid such anti-islanding protection is not required and such functionality is removed from the micro-inverters.

Through the provision of a non-grid reference signal, inclusion of a resistive load 100 and, in some embodiments, removal of anti-islanding protection from the PV micro-inverters 72, the present system 200 provides a micro-grid electrical generation system that allows for highly efficient operation without the inclusion of a battery bank(s) and without grid-tying. Accordingly, the system can generate power even when a utility power grid is down. That is, as opposed to grid-tied PV systems that shut down when the utility power grid goes down, the present system allows for continued operation in 'black-out' conditions. As will be appreciated, owners of previous grid-tied PV systems have found that, while they have PV electrical generation systems, they are without power when the utility power grid goes down leaving them in no better condition than their neighbors without a PV system. Likewise, previous owners of PV systems that are operative when a utility power grid goes down have relied on PV systems that do not utilize individual micro-inverters and which typically utilize DC power to charge battery banks.

Figure 6:
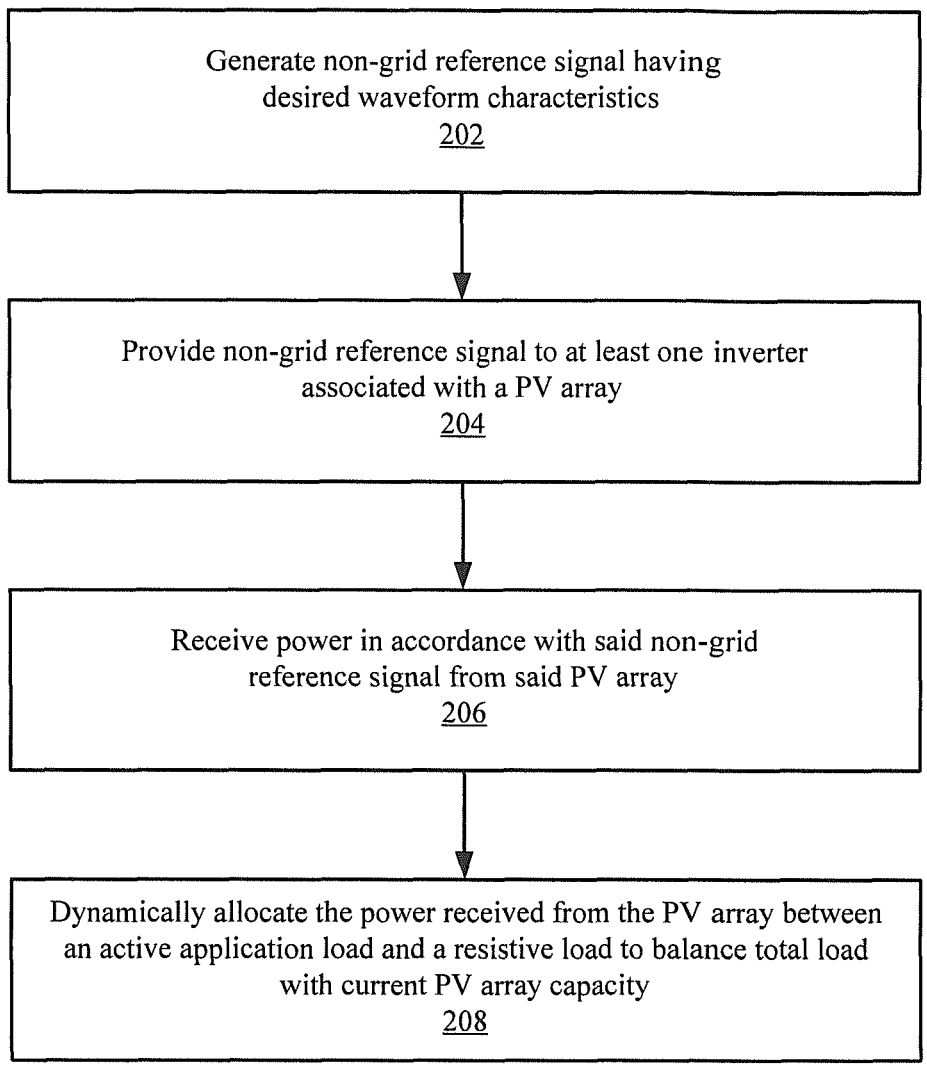
FIG. 6 illustrates one process that may be implemented by a renewable hot water heating system in accordance with the present disclosure.

FIG. 6 illustrates one process 201 that may be implemented by the present system 200. Initially, the process 201 includes the generation 202 of a non-grid reference signal (e.g., at the controller 80 or at a master micro-inverter) having desired waveform characteristics. In this regard, the non-grid reference signal may include the desired frequency and/or maximum voltage that may be utilized by the inverters of the PV array. Accordingly, the non-grid reference signal is provided 202 to the micro-inverters 72 of the PV array 60. Power is then received 206 from the PV array in accordance with the waveform characteristics of the non-grid reference signal. At this time, the controller 80 is operative to dynamically allocate 208 the power received from the PV array 60 between one or more active application loads and/or a resistive load in order to balance the total current load with the total current PV array capacity. In this regard, the PV array may operate at or near maximum output capacity without requiring grid-tie or battery banks to utilize any excess power above the load requirements of the active application loads.

Though primarily discussed as utilizing micro-inverters 72 that allow the PV array 60 to provide AC electrical power to the controller 80, it will be appreciated that in other embodiments, the PV array may provide DC power to the controller which then applies DC power to active application loads (e.g., DC devices) and a resistive load(s) free of battery storage. In such an arrangement, MPPT algorithms may likewise be implemented to enhance or tailor the power output of the array. Further, while discussed as utilizing MPPT (e.g., in micro-inverters for AC systems or in a DC system) for maximizing the output of the PV array, it will be further appreciated that the MPPT functionality may be utilized to match the power from the PV array with a particular application load. For instance, where the resistive load forms a heating element in hot water heater, MPPT functionality may be utilized to condition the generated power to match the requirements of the heating element. That is, the generated power may be conditioned to have voltages or currents that are within an acceptable window for the resistive element. Such tailoring of the electrical power may allow the system to be utilized with varying resistive elements and/or active loads.

Figure 7:
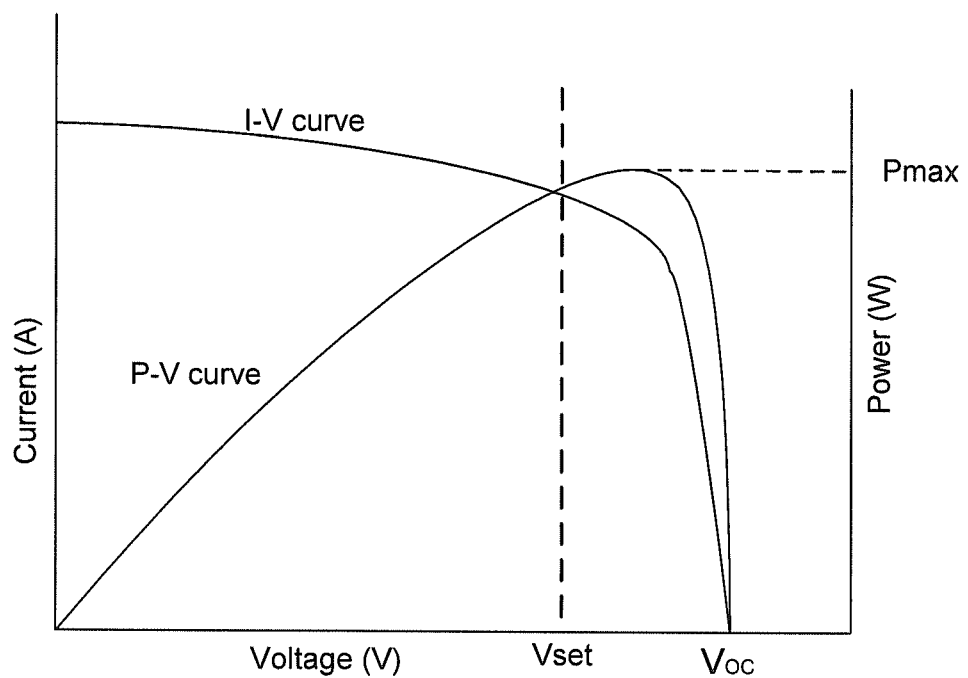
FIG. 7 illustrates a PV curve.

In a further embodiment, rather than maximizing the power output of the array, the output voltage of the array is regulated to a constant value. The generation of a constant voltage from the PV array may allow the use of a PV array to power standard electronic devices (e.g., 110V electronics) that require voltages within a narrow operating window. In order to generate a constant voltage, the controller and/or the micro-inverters mounted to each panel may vary the resistance seen by the array. As will be appreciated, photovoltaic cells have a complex relationship between their operating environment and the maximum power they can produce. For any given set of operational conditions (e.g., temperature, solar intensity), cells have a single operating point where the values of the current (I) and Voltage (V) of the cell result in a maximum power output. These values correspond to a particular load resistance, which is equal to V/I as specified by Ohm's Law. The power P is given by P=V*I. The I-V curve and P-V curve for a single set of operational conditions is shown in FIG. 7. These are dynamic quantities which changes depending on the level of illumination, as well as other factors such as temperature and the age of the cell.

As shown, the maximum power point or peak power point occurs at the apex or "knee" of the P-V curve. Accordingly, MPPT tracking typically alters internal resistance of the panels shift the array operating point to the peak power point. In operation, a load with resistance R=V/I would draw the maximum power from the device. If no active loads are being used and all power is applied to the heating element, this allows applying energy at any voltage to the heating element. That is, wild power (AC or DC) may be used. Likewise, the presented systems allow for altering the resistance of the loads to match the maximum power potential of the array. However, MPPT tracking may shift the array operating point away from the peak power point from the peak power point to maintain a constant voltage (e.g., user selected or set voltage) as illustrated by the dashed line $V_{SET}$. That is, as V=IR, it is possible to vary the resistance to maintain a constant voltage. The presented systems allow for altering such resistance using micro-inverters and/or variable resistance sinks/resistive loads.

Referring again to FIG. 5, one exemplary resistive load 190 in accordance with various aspects of the presented inventions is illustrated. In this embodiment, a hot water heater 10 is provided that may be utilized to heat water for residential and/or commercial applications. A supplemental heating element 110 (i.e., resistive load) generates heat in response to an applied current from the controller 80. In this regard, the inclusion of this heating element 110 into the hot water heater 10 allows for the direct application electrical power from the controller 80. This allows any excess power from the PV array, which is not utilized by active application loads (i.e., if utilized), to be utilized to heat water and thereby allows balancing a total load with the PV array capacity. Such a supplemental hot water heating system is set forth in co-owned U.S. patent application Ser. Nos. 13/442,701; 13/442,714; 13/442,753; and 13/442,737, the entire contents of which are incorporated herein by reference.

As shown, the hot water heater 10 is an electrical hot water heater that utilizes an electrical heating element 32 as a heat source for heating water within a storage tank 12. The element 32 is controlled by a thermostat (not shown), which activates the element 32 (e.g., completes a circuit) when a temperature within the tank 12 drops below a predetermined temperature.

FIG. 5 also illustrates (e.g., in phantom) components of a gas fired hot water heater. The gas fired water heater includes a burner 18 disposed below the tank 12, which is controlled by a thermostat, that ignites when a temperature within the tank 12 drops below a predetermined temperature. The burner 18 may further include a standing pilot light, piezoelectric ignition system or other ignition system. In such a gas-fired hot water heater, an exhaust gas chimney or internal flue (not shown) would extend through the center of the tank to vent combusted burner gases to an outside vent. The present system may be utilized with an electric, gas or hybrid (i.e., gas and electric) hot water heater.

In the present embodiment, the supplemental heating element 110 in inserted into the water heater 10 though the outlet orifice. However, it will be appreciated that the location and configuration of the supplement heating element 110 may be varied as set forth in U.S. patent application Ser. Nos. 13/442,701; 13/442,714; 13/442,753; and 13/442,737 as previously incorporated. In this regard, the supplemental heating element may be adapted for insertion into, a pressure relief valve opening, a drain valve opening, circulation port, an anode opening, primary electrical heater element opening and/or a combination thereof. The size and configuration of the electrical element 110 may be selected based on the size of the tank, power rating of the renewable energy source etc.

While the resistive load 100 illustrated in this embodiment is a heating element 110 that is disposed within a hot water heater 10, it will be appreciated that other resistive loads may be utilized as well. By way of example only, other resistive loads may include heating elements (e.g., heated flooring underlayments, space heaters, ovens etc.). What is important is that there is a resistive load available to utilize any excess (or potentially all) power generated by the PV array such that the output of the PV array may be maximized or tailored to a particular voltage without the use of battery banks or grid-tying.

The controller 80 is operative to monitor the operation of the PV array 60 and dynamically allocate power from the PV array 60. Monitoring the operation of the PV array may include monitoring one or more photovoltaic sensor signals (e.g., radiation intensity signals) and/or temperatures signals. The power output by the arrays 60 can also be monitored/measured. In any arrangement, the controller 80 is operative to determine the amount of power being generated by the PV array such that the power may be allocated to an active load(s) 92 and/or the resistive load 100. The controller 80 may also provide control signals to the PV array 60 to maximize the power output or generate a desired voltage. When micro-inverters 72 are utilized to convert DC electricity to AC electricity at the solar arrays 60, the conduction of AC power over the electrical connectors permits communication between the controller 80 and the solar arrays 60 via the electrical conductors 64, 66. That is, the system may utilize power line communication (PLC) to carry data on conductor 64, 66 that is simultaneously utilized for AC electric power delivery to the controller 80. In this regard, the reference signal may be supplied to the micro-inverters 72 via one of the conductors 64 or 66. However, this is not a requirement.

The controller 80 in the present embodiment further includes a processing unit 86 that includes a processor 88, memory 90 and one or more input/output interfaces. The processor 88 performs various control operations (e.g., control logic) stored within volatile and/or non-volatile memory. Other components of the controller 80 are within the skill of the art and are within the scope of the present invention. For example, controller 80 may also include an analog-to-digital converter for converting a signal proportional to the incident radiation provided by a sensor or PV panel to a digital value and the microprocessor or similar device for controlling one or switches may selectively apply power to one or more active loads and/or resistive elements. In this regard, the controller may generate active load control signals and resistive load control signals to affect operation of one or more switches to connect and disconnect the active loads and resistive load(s). The controller also includes a display 94 and a user input device 96.

As shown in FIG. 5, the controller 80 also includes an electronic switching circuit 82. The electronic switching circuit 82 may include various switches (e.g., solid state switches, etc.) that allow for selectively completing or opening and closing circuits between the PV arrays 60 the active load(s) 92 and/or the resistive load 100. As shown, the switching circuit 82 receives power from the PV arrays 60 and selectively allocates that power to the active load 92 and/or resistive load 100 at the control of the processor. In this regard, a first output 54 is interconnected to the resistive load 100, which in the present embodiment is the supplemental heating element 110 disposed within the hot water heater 10. Additional outputs 56*a-n* may be interconnected to one or more active application loads 92. For instance, such active loads may include, without limitation, lighting that is utilized during working (e.g., daylight) hours, blowers associated with heating systems (e.g., natural gas), refrigeration/freezing systems, heating devices, etc. In such an arrangement, the controller is operative to assess the power needs of the active loads such that power may be dynamically distributed between the active loads 92 and the resistive load 100 to maximize the power output of the PV array 60 and/or maintain a desired output voltage.

In one arrangement, each of the outputs 56*a-n* includes a load indicator 58 for use determining the current load requirements of the active loads. In one specific embodiment, the load indicator 58 is formed of a shunt resistor sized for the intended active load that provides an output which indicates when the circuit is operating at full capacity. The active loads may be serially activated until insufficient power is available to operate the active circuits at full capacity. Accordingly, the circuits for which full power is available may be activated, and active loads for which insufficient power is available may remain inactive and any remaining power may be allocated to the resistive load, which may further include a variable resistor 52 (e.g., rheostat, potentiometer etc.) to maintain a balance between the active loads and the resistive load and/or to adjust the resistance provided by the resistive load to generate a desired voltage, which may be selected by a user.

Alternatively, all power may be initially applied to the resistive load and each active load may be individually activated. The resulting power drop of the resistive circuit may be measured to derive the load requirement of each active load. In any arrangement, once the load requirements of the active loads are determined, the active loads may be connected to the electrical power from the PV array. Likewise, if insufficient power is available for all active loads, the active loads may be powered in order of importance, which may be dictated by the system owner. Further, the controller 80 may include a standard output 56*c* (e.g., 12 v DC, 24 v DC, 110 v AC or 220 vAC outlet) that allows for plugging an electrical device into the controller 80. In this regard, if utility power is not available, a system owner may plug an electrical device directly into the micro-grid of the PV system to power that device. In this regard, the system 200 may be utilized as an emergency power supply if utility power is lost.

In any arrangement, the processor 88 can execute software or other executable code/logic stored in the memory 90. The software/logic stored within the volatile memory may also allow the processor to monitor power produced by the PV array 60 and dynamically allocate this power between the active application loads and/or the resistive load. Further, such software/logic may allow a user to select where and/or with what priority the electricity is allocated.

Figure 8:
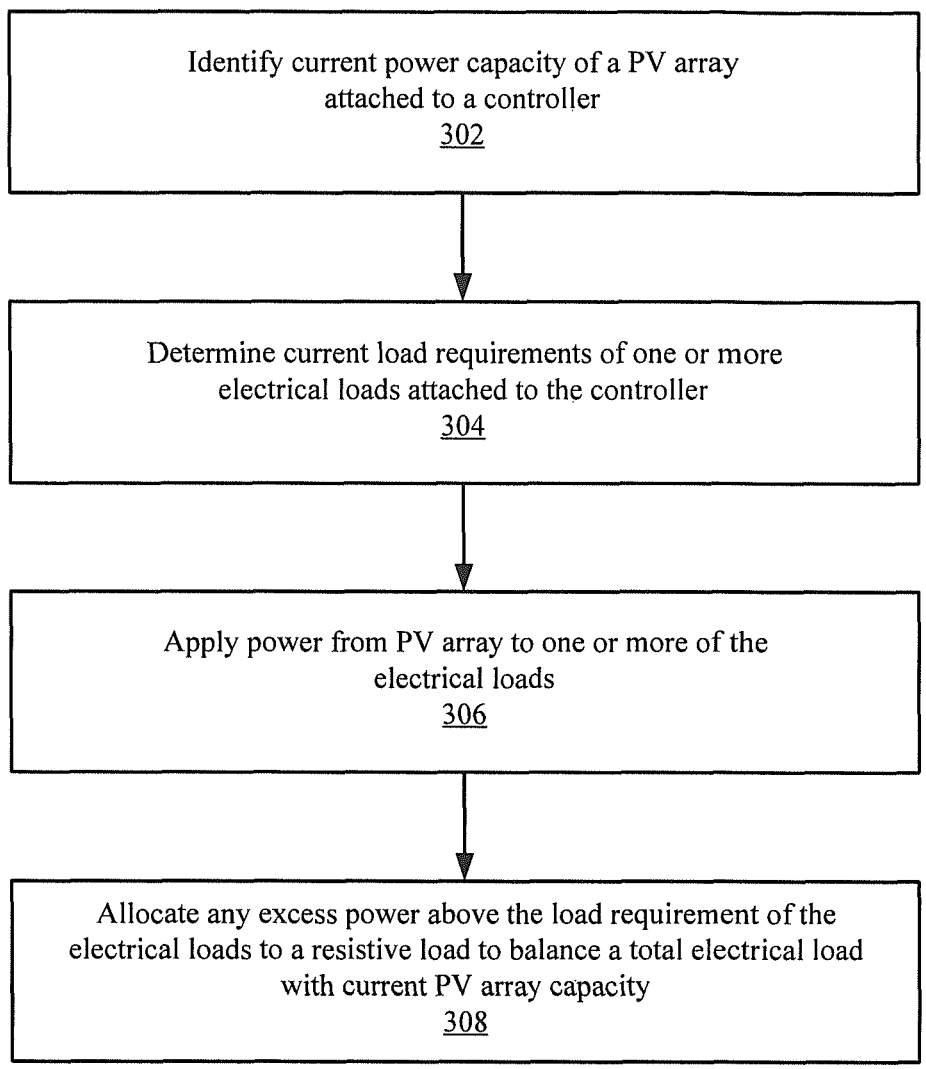
FIG. 8. illustrates one process that may be implemented by a renewable hot water heating system in accordance with the present disclosure.

A process 300 that may be implemented by the controller is illustrated in FIG. 8. Initially, the controller 80 is operative to identify 302 the current power capacity of the PV array attached to the controller. In addition to identifying the current power capacity the PV array, the controller 80 is also operative to determine current load requirements 304 of one or more active electrical loads attached to the controller 80.

Based on the available power capacity and current load requirements, the controller is operative to determine which of the active loads can be powered and then selectively apply power 306 from the PV array to fully power one or more of the active loads. The controller 80 is further operative to allocate 308 any excess power above the load requirements of the active loads to the resistive load in order to balance the total electric load with the current PV array capacity and/or to maintain a desired voltage output of the PV array. Again, this allows for powering one or more active electrical loads while utilizing the full capacity of the PV array for the benefit of the PV system owner.

Referring again to FIG. 5, it is further noted that the controller may also be connected to a communications interface that may be represented by a variety of different devices. In this regard, the controller may be interconnected to a data network via, for example, Ethernet, RS485, SD card, a USB connection and/or a telephonic connection (e.g., cellular or landline.) In this regard, the controller may be interconnected to external systems that may interact with and/or provide further control inputs to the controller 80.

The communications ability of the controller 80 allows in some embodiments for the system to utilize smart grid information. The term "smart-grid" generally refers to a utility power grid that allows communication between the utility power grid and the end user's electrical devices (load/demand). The communication between supply and demand enables the efficient, "smart" use of electricity. The smart-grid generally allows utilities to gather real-time information about load demands, upsets, outages, and net metered (customer owned) generation. In some arrangements, such smart grid functionality also allows a utility power provider to control operation of one or more customer devices. More importantly in the present application, data connection with a smart grid, or other data communication with a utility, allows the PV system to have-real time information about the immediate availability of power and its cost, as well as what the availability and cost will be in the very near future. Similarly, the controller may communicate with other utilities (e.g., natural gas utilities) to determine the cost of other power sources. Such information may allow the controller to dynamically apply the power from the PV array(s) 60 to loads (e.g., active application load(s) and/or resistive loads) to enhance the economic benefit of the system 200 for its owner.

In this embodiment, the PV system 200 may obtain information from a utility source relating to the current cost of the utility provided power. Likewise, the system may obtain information (e.g., input from the system user, obtained on-line etc.) relating to the cost of, for example, fossil fuel sources (e.g., heating oil, natural gas). This information may be utilized in conjunction with information relating to the available capacity of the PV array, the load requirements of one or more active applications and/or the heating requirements of a resistive load. Based on this information, the PV system may be operative to selectively apply PV power to enhance the benefit to the PV system owner.

For instance, referring again to FIG. 5, the PV system is operative to heat water within a hot water heater 10. In this regard, it has been determined that approximately 30% of the power consumption of an average household is directed to heating water. Due to the high percentage of overall power consumption of heating water, the most economically beneficial use of the PV power in many instances is to heat the water in the hot water heater to prevent the system owner from purchasing power (e.g., electrical power or natural gas/propane) for heating water. However, this determination may vary based on the varying price of electrical power. That is, in some utility power grids, the price of electricity varies throughout the day based on overall grid demands. Energy generated at peak demand times may be valued higher than that generated at off-peak demand times. This is also known as "time of use tariff," or TOU. The TOU rates are scaled so that electricity at off-peak times is charged at a discount, and electricity at peak times is charged at a premium. In the Southwestern United States, peak demand usually occurs approximately two to four hours after the peak sunshine period of the day (i.e. approximately 3:00 p.m. to 6:00 p.m.). Energy consumed at the peak will cost the consumer more. Accordingly, the ability of the controller 80 to obtain such information allows for altering the allocation of the PV power from the array.

During peak-times when electrical power costs are high, it may be more economically beneficial for the controller to allow a gas hot water heater to utilize a fossil fuel source to heat water and utilize all available PV power to operate other electrical loads. Likewise, at off-peak times when electrical power costs are low, it may be more economically beneficial to direct all available PV power to heat water in the hot water heater and purchase electrical power to handle other needs. In such an arrangement, the controller 80 may also be interconnected to the gas heating element 18 of the hot water heater (or electric element 34 in the case of an electric hot water heater), which is interconnected to a utility or fossil fuel power source. In this arrangement, the controller 80 implements logic that allows for controlling both the supplementary heating element 110 and the standard heating element 18 of the hot water heater 10.

In addition to being connected to the active application load(s) and resistive load(s), the controller 80 may, in another embodiment be operatively interconnected to the power utility grid. In such an arrangement, the system 200 includes a grid-tie inverter (e.g., in the controller 80 and/or grid-tie micro-inverted mounted on the panels individually or otherwise) such that the generated power may be diverted into the power utility grid. As will be appreciated, return of such energy to the grid may allow the system owner to sell or 'net-meter' power back to the utility.

In such an embodiment, the PV system can, based on economic considerations, input energy back into the utility power grid. In such an arrangement, the micro-inverters 72 will include anti-islanding functionality and the controller may provide a grid reference signal to the micro-inverters 72. In this embodiment, the PV system has the further ability to sell power back to the grid (e.g., net-meter) if beneficial to the PV system owner. Specifically, this embodiment balances the benefit of using PV power to operate a resistive load to generate heat (e.g. hot water, space heating etc) relative to selling (e.g., net metering) the PV power to the utility power grid.

Figure 9:
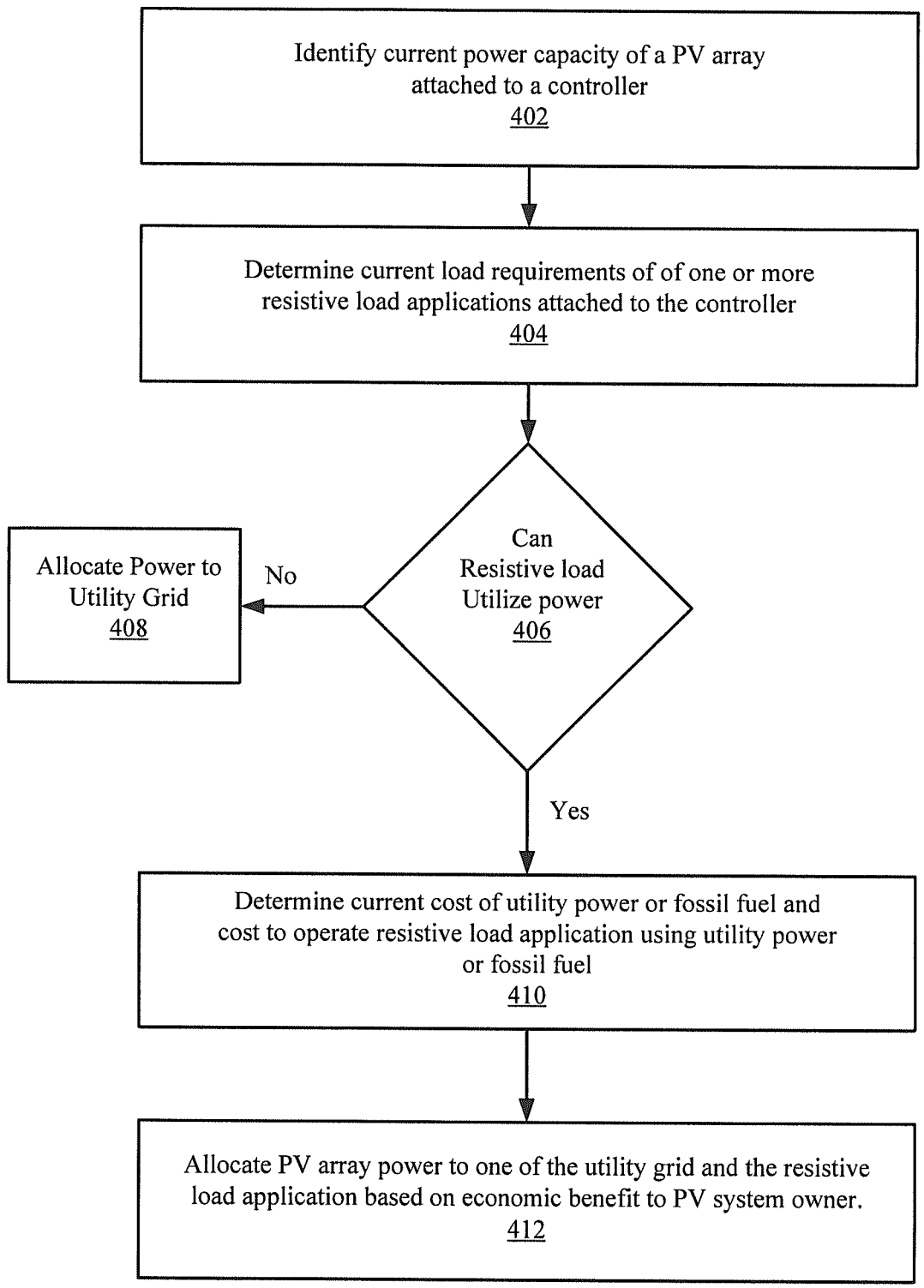
FIG. 9. illustrates one process that may be implemented by a renewable hot water heating system in accordance with the present disclosure.

A process 400 for determining the benefit of using PV power for resistive heating applications relative to selling the PV power to a utility power grid is set forth in FIG. 9. Initially, the process includes identifying 402 the current PV power capacity of PV array connected to a controller. The process further includes determining 404 the current load requirements of one or more resistive load applications. By way of example where the resistive load application includes heating water in a hot water heater, this determination may include identifying the current temperature of the water with the hot water heater and/or identifying expected usage times for the hot water heater. In the latter regard, the user may input information into the controller regarding usage times and/or the controller may incorporate logic that allows for determining such usage times. In any arrangement, a determination 406 may be made as to the availability of the resistive application load to currently utilize the PV power. If the resistive application load cannot utilize the PV power, the controller directs the PV power into the grid to sell the power 408. If the resistive load application can utilize the PV power, a determination 410 is made as to the cost of utility power (e.g., electricity, natural gas) or fossil fuel (e.g., propane, fuel oil) and the cost to operate the resistive load using the utility power or fossil fuel. If it is more cost effective to utilize the utility power/fossil fuel to operate the resistive load application or more beneficial to entirely disable the resistive load (e.g., utilize utility powered electrical element of a hot water heater), then the PV power is allocated 412 to the utility grid. If it is more cost effective to use the PV power to operate the resistive load, the PV power is allocated 412 to the resistive load. In the latter regard, the controller may be operative to deactivate the utility power/fossil fuel from the resistive load. For instance, in the case of a natural gas/propane burner in a hot water heater, the burner may be deactivated while the PV power is utilized to provide heat to an electric element within the hot water heater.

In a further embodiment, the controller 80 allows a user to select a maximum output water temperature that is separate from the temperature of the water within the tank. In this arrangement, to regulate the output temperature of the water from the water tank, the water tank further incorporates a mixing valve 98. See FIG. 5. This mixing valve 98 is interconnected between the water inlet 16 and the water outlet 14 of the tank 12. The valve 98 allows for mixing unheated water from the inlet pipe 16 with water exiting the outlet 14 of the hot water heater 10. In this arrangement, the outlet 14 may include a temperature sensor 78 downstream from the mixing valve 98 such that the valve may be opened and closed to generate a desired downstream temperature. Alternatively, such a mixing valve may be disposed in-line with the hot water outlet and moderate temperature by selectively opening and closing the port to the hot water. As will be appreciated, such a system allows for heating the water in the tank to a higher temperature while maintaining a lower maximum output temperature. That is, the water within the tank may be heated to a higher temperature (e.g., 1500) while the maximum outlet water temperature is maintained at a lower level (e.g., 110-120°). Accordingly, the controller 98 may utilize this information to control the mixing value to achieve this desired output temperature. The user may set the desired output temperature via the display.

In one arrangement, the controller includes logic that allows the controller 80 to determine usage times for the hot water heater. To identify usage patterns the controller is interconnected to a sensor (e.g., flow sensor) that identifies when water flows out of the hot water heater 10. This sensor may be incorporated into the temperature sensor that identifies downstream temperatures exiting the hot water heater. Alternatively, this may be a separate sensor. Over time, the logic identifies usage times and utilizes this information to selectively operate the heating elements. For instance, the controller 80 may identify the primary usage periods between 6 am and 9 am in the morning and between 5 pm and 9 pm in the evening. Based on the usage patterns, the controller 80 may deactivate the standard heating element 34 between the hours of 9 am and 5 pm such that the only energy input to the hot water heater during this period is provided by the renewable energy source. As will be appreciated, if hot water is utilized between 8:30 am and 9 am, the water in the tank will be below the threshold level and typically the standard heating element 34 or in the case of a gas heater the burner would operate to bring the temperature of the water back to the threshold level. However, if there is no anticipated usage of water for a predetermined or user settable period (e.g., an hour) and renewable energy is being received from the renewable energy source, the controller may deactivate the standard element/burner to allow heating to be provided by the renewable energy source. Variations exist in this methodology. For instance, if a tap is opened and water begins to flow out of the hot water heater, the controller may re-initiate operation of the standard element. In a further arrangement, the controller is programmable such that a user (e.g., homeowner) may set the times during which the standard element or burner is to be inoperative.

In a further arrangement where the system includes one or more inverters, power from the renewable energy source 60 may also be diverted to the grid at the control of a power provider or utility (e.g., electric company). In this arrangement, in addition to be able to shut off the standard heating element connected to the utility, energy from the renewable energy source may be diverted into the grid to provide additional energy during peak demand times. As will be appreciated, return of such energy to the grid may allow the homeowner (or other user) to sell energy back to the utility during peak demand times (e.g., net meter). Likewise, in further embodiments, the controller is operative to divert energy into the grid once the temperature within the water tank and/or PCM material reaches a desired maximum threshold. At such time, rather than simply opening the circuit such that the renewable energy source is inactive, the energy from the source may be diverted into the grid to the benefit of the owner of the system.

The ability to interconnect the controller to an outside network also allows the use of the system to generate of renewable energy certificates (RECs). RECs, also known as Green tags, Renewable Energy Credits, Renewable Electricity Certificates, or Tradable Renewable Certificates (TRCs), are tradable, non-tangible energy commodities in the United States that represent proof that 1 megawatt-hour (MWh) of electricity was generated from an eligible renewable energy resource (renewable electricity). Solar renewable energy certificates (SRECs) are RECs that are specifically generated by solar energy.

These certificates can be sold and traded or bartered, and the owner of the REC can claim to have purchased renewable energy. In states that have a REC program, a green energy provider is typically credited with one REC for every 1,000 kWh or 1 MWh of electricity it produces (for reference, an average residential customer consumes about 800 kWh in a month). Further, a number of states are currently mandating that utilities provide a minimum portion of the energy they supply from renewable energy. These minimum renewable energy requirements are set to increase in coming years in a number of states.

In order to produce RECs or SRECs, a system must first be certified by state regulatory agencies, usually public service commissions or public utility commissions, and then registered with a trading platform. Once a system is certified with the state agency and registered with a trading platform, SRECs can be issued using either an estimate table or actual meter readings by the trading platform—depending upon state regulations. Accordingly, the above noted systems may be certified prior to or after installation to allow for the tracking of renewable energy and the creation of RECs and/or SRECs.

In this embodiment, the controller 80 is operative to monitor the amount energy generated by the renewable energy source and report this information to the user, a trading platform, device seller, device installer or utility (any of which may report to a trading platform). As will be appreciated, these devices themselves each may produce a small amount of energy, but the aggregation of these amounts to produce RECs may have significant value to the owner of the RECs. For instance, a device installer, device seller, manufacturer, utility or other entity (i.e., third party) may provide rebates to customers installing the renewable heating devices in exchange for the future rights to the RECs generated by the devices. Thus, the third party may, but need not necessarily, subsidize the cost of the devices and recoup this investment in the future based on the generation of RECs/SRECs. In this arrangement, the third party may bundle the renewable energy reported by multiple systems to amass RECs. This allows the utility to generate the RECs that may be applied to their renewable energy requirements or sell the RECs to other entities.

It will be appreciated that the controller may have functionality in addition to those discussed above. For instance, the controller may provide feedback to the owner of the system. In one arrangement, the controller may provide instant cost/consumption information to the user. Such information may allow the user to control their energy uses. This information may include electrical cost information for energy received from a utility provider, which in some regions varies throughout the duration of the day. That is, electrical power may be cheaper during low demand times and more expensive during high demand times. Accordingly, feedback may be provided to the user that allows the user to determine when a utility connected electrical heating element (or potentially gas-fired element) should be deactivated. Further, the controller may provide feedback regarding the savings and/or credits accumulated by the user of the system. All of this information may provide feedback that allows for consumptive patterns to be modified to produce desired results (e.g., energy saving, reduced carbon footprint, etc.) through greater energy awareness.

Figure 10:
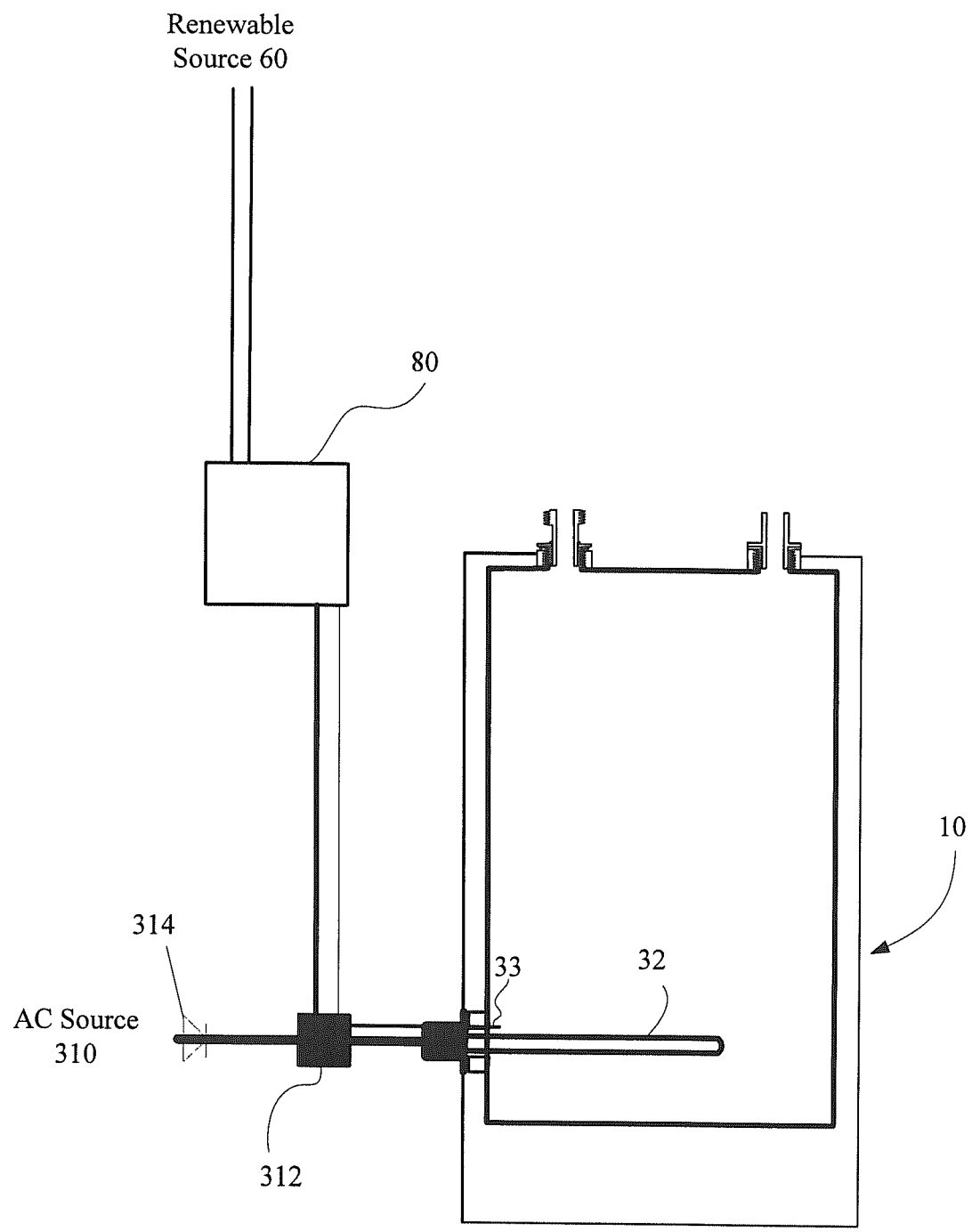
FIG. 10 illustrates a renewable hot water heating system integrated with a utility power supply.

FIG. 10 illustrates a further embodiment of a system that allows interconnection of a water heater to a renewable energy source. In this embodiment, a renewable energy source, for example PV array 60, and an AC source 310 are connected to a single or common heater element 32. Various arrangements are possible for the dual connection of the renewable energy source 60 and the AC source to 10 to the common heater element 32.

In a first embodiment, a controller 80, which in some arrangements may include an inverter, receives power from a renewable energy source 60 and is electrically interconnected to a junction box 312. The controller 80 provides electrical power from the renewable energy source to the junction box 312. In addition, the controller 80 controls a switch within the junction box 312 to selectively connect and disconnect the power sources. For instance, the switch may disconnect the AC source 310 when sufficient electrical power is received from the renewable energy source 60. In this regard, upon determining that the power from the renewable energy source is above a predetermined minimum, the AC power source 310 is disconnected and electrical energy from the renewable energy source 60 is provided directly to the heater element 32. The electrical energy provided from the renewable energy source 60 may be in the form of a DC current or, if inverter is utilized, in the form of an AC current.

The present inventors have also recognized that electrical heater elements, which are primarily designed for use with an AC current, are also operative upon the application of a DC current. That is, there is little difference in AC element in a DC element so long as the maximum wattage provided by the renewable energy source/PV array 60 is below the maximum wattage for the element. Typically, such AC heating elements have a maximum wattage rating over 500 W and more commonly over 2000 W. Accordingly, the PV array 60 or other renewable energy source may be sized to have a maximum wattage output that is less than the wattage rating of the heating element.

In a second embodiment, AC current may be provided from the renewable energy source to the heater element 32. In this embodiment, an inverter may be combined with the controller or otherwise disposed between the renewable energy source 60 and the junction box 312. In a further arrangement, micro-inverters may be mounted on each of the PV panels of the solar array. Micro-inverters produce utility matching power directly at the back of the panel. Such arrays of panels are connected in parallel to each other and fed to an application and/or to the grid. This has the major advantage that a single failing panel or inverter will not take the entire string of panels offline. In any arrangement utilizing an inverter, AC current may be fed to the heating element 32 to generate heat. Again, such a system may utilize a junction box 312 that disconnects the AC power source 310 prior to application of the AC current from the renewable energy source 60. Alternatively, a block-in diode 314 may be disposed in line between the AC source 310 in the junction box 312 to prevent AC current from the renewable energy source 60 from entering into the grid. In an arrangement incorporating the blocking diode 314, the system may not need anti-islanding protection that, in the event of a power failure on the grid, turns off typical grid-tie inverters for a short period of time. This prevents the inverters from continuing to feed power into small sections of the grid, known as "islands" as powered islands present a risk to workers who may expect the area to be unpowered. That is, the blocking diode 314 maintains separation between the AC current received from the inverter in the AC power from the utility/grid.

In a further embodiment, the system utilizes a grid-tie inverter (e.g., integrated into the controller, panels and/or standalone unit) which matches phase of the renewable energy AC power with the sine wave of the utility-supplied AC power 310. In this arrangement, the power from both sources 60, 310 are matched and may be applied to the heating element 32 separately and/or simultaneously. The system may again utilize a junction box 312 that incorporates a switch for disconnecting the AC power source 310 when sufficient energy is available from the renewable energy source 60. Alternatively, the system may utilize power from both sources 60, 310. In this regard, power from the renewable energy source 60 may supplement power from the AC source 310, which works to reduce the overall power usage from the AC source 310. Furthermore, in this embodiment, excess power from the renewable energy source 60 may be fed back into the grid. That is, if the renewable energy source 60 provides more power than is necessary to operate the heating element or if the heating element is deactivated due to the water temperature in the tank achieving a desired temperature, the energy from renewable energy source 60 may be fed directly back into the grid in a net metering arrangement.

The heater element 32 as illustrated in FIG. 10 also incorporates a water sensor 33. An output of the water sensor may be provided to the controller 80 to ensure that the element is not electrified in absence of water covering the sensor. As will be appreciated, electrifying hot water heating elements in the absence of water is the leading cause of element failure. Accordingly, such a sensor may be included with any heating element of the present disclosure.

Figure 11:
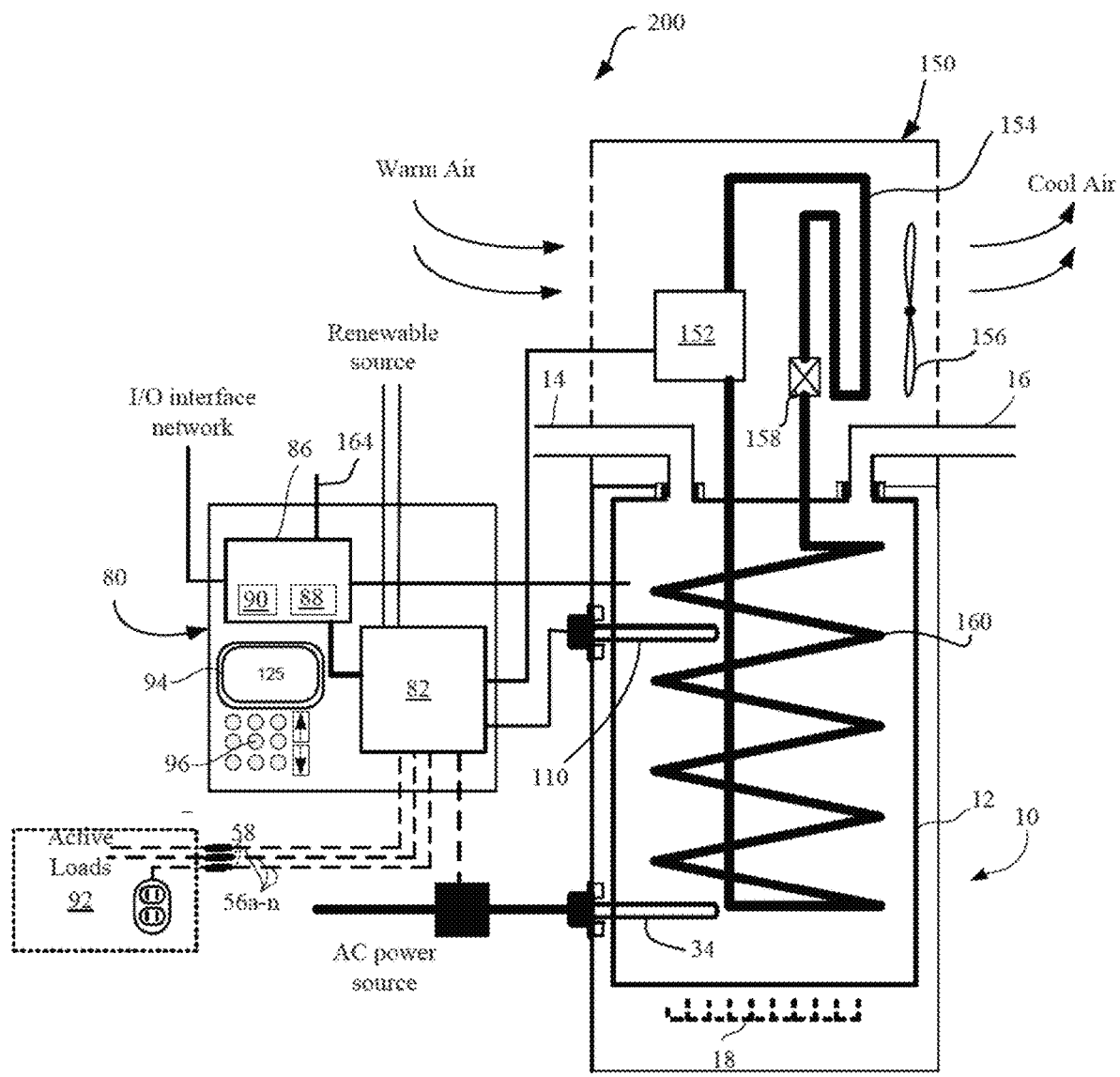
FIG. 11 illustrates one embodiment of a renewable hot water heating system incorporating a heat pump.

FIG. 11 illustrates a further embodiment of a hot water heating system 200 that utilizes a renewable energy source. In this embodiment, a renewable energy source powers a heat pump 150 that provides thermal energy to a hot water heater or other water storage system. As will be appreciated, a heat pump is a device that provides heat energy from a source of heat to a destination. More specifically, heat pumps are most commonly designed to move thermal energy opposite to the direction of spontaneous heat flow by absorbing heat from a first location (i.e., heat source) and releasing it to a second warmer location (i.e., heat sink). When a heat pump is used for heating, it employs the same basic refrigeration cycle used by an air conditioner or a refrigerator, but in the opposite direction—releasing heat into a space rather than the surrounding environment.

Heat pumps are often used to provide heating as less energy is required for their operation than appears in the released heat. Most of the energy for heating comes from the external environment, and only a fraction comes from electricity (or other energy source) required to run a compressor of a refrigeration cycle. In electrically powered heat pumps, the heat transferred can sometimes be three or four times larger than the electrical power consumed, giving the system a coefficient of performance (COP) of 3 or 4, as opposed to a COP of close to 1 for a conventional electrical resistance heater where input electrical energy produces all the heat. While highly efficient, a heat pump uses some amount of external power to accomplish the work of transferring energy from the heat source to the heat sink. In the present embodiment, the heat pump is powered by a renewable energy source (e.g., PV system or wind turbine).

Heat pumps use a refrigerant as an intermediate fluid to absorb heat where it vaporizes, in an evaporator, and then to release heat where the refrigerant condenses, in a condenser. The refrigerant typically flows through pipes between the evaporator and the condenser. The refrigerant can be any refrigerant used in traditional air conditioning and/or heat pump systems. Non-limiting exemplary refrigerants include carbon dioxide, hydrofluorocarbons, and hydrochlorofluorocarbons. Other examples of refrigerants include chlorodifluoromethane (sold as R-22), chloropentafluoroethane (sold as R-502), dichlorodifluoromethane (sold as R-12), trichlorofluoromethane (sold as R-11), trichlorotrifluoroethane (sold as R-113), tetrafluoroethane (sold as R-134a), and dichlorotrifluoroethane (sold as R-123). In one embodiment, the refrigerant is carbon dioxide.

The illustrated heat pump water heating system 200 includes a hot water heater 10 having first and second electrical heating elements 110, 34 disposed within a storage tank 12. The storage tank includes a cold water inlet 16 and a hot water outlet 14. Incorporated with the hot water heater is a heat pump 150 having a compressor 152, an evaporator 154, a fan 156 and an expansion device/valve 158. Though the heat pump and its components are illustrated as being disposed on top of the storage tank 12, it will be appreciated that other configurations are possible. That is, the heat pump may be connected to a water heater or any other water storage device via appropriate piping. As shown, the heat pump 150 further includes a condenser coil 160 that is disposed within the storage tank. The coiled condenser tube(s) can be made of any metal such as, for example, copper or a copper alloy. Further, the coiled condenser tube(s) can be made from a single tube forming coils or multiple tubes forming coils. The condenser tube(s) can each be made of a single wall tube or double walls in order to prevent any contamination of the liquid in the tank 12 with refrigerant due to a rupture in a single tube configuration. In the present embodiment, the condenser coil enters and exits through a top surface of the storage tank. However, other arrangements are possible and within the scope of the present invention. The compressor, evaporator, expansion device and condenser coil form a closed loop system that contains refrigerant. A controller 80 controls the operation of the heat pump 150 and a utility powered heating element 34 (or 18) and an optional supplemental heating element 110. If utilized, the supplemental heating element 110 is also powered by the renewable source.

In operation, compressed refrigerant exits the compressor 152 at a temperature controlled by the controller 80, which may be user set or automated. In this regard, the compressor forms the pump of the closed loop system. The compressed refrigerant exits the compressor at a high pressure and a high enthalpy. The refrigerant then flows into the storage tank 12 at a high pressure via an inlet leg of the coiled condenser tube 160. Water, in the tank 12, exchanges heat with the compressed refrigerant flowing through the immersed coiled condenser tube 160. The compressed refrigerant transfers heat into the water, and the refrigerant exits the tank via the return leg of the coiled condenser tube 160 as cooled refrigerant. The cooled refrigerant (i.e., returning refrigerant) is at a low enthalpy and a high pressure.

The returning refrigerant is carried out of the tank 12 to the expansion device 158. The returning refrigerant passes through the expansion device 158, which expands and reduces the pressure of the refrigerant. The expansion device 158 can be, for example, a capillary tube or Automatic Expansion Valve ("AEV") or a Thermostatic Expansion Valve ("TEV") or an Electronic Expansion Valve ("EXV") or other known type of expansion device. After expansion, the refrigerant flows into the evaporator 154 equipped with a fan 156 and exits at a high enthalpy and a low pressure. In the evaporator 154, the refrigerant absorbs heat from surrounding air thereby heating the refrigerant. The flow of the surrounding air is aided by the fan such that the surrounding air exchanges heat with the refrigerant passing through the evaporator 154. The temperature difference between the surrounding air and the refrigerant in the evaporator 154 drives the thermal energy transfer from the surrounding air to the refrigerant as the refrigerant flows through the evaporator 154. The refrigerant then reenters the compressor, completing the cycle.

The controller 80 of the heat pump water heating system 200 may utilize any of the control schemes discussed above. For instance, the heat pump water heating system 200 may operate the heat pump 150 when sufficient power is received from the renewable source and deactivate the utility powered heating element(s) 34 if utility powered heating elements are utilized. That is, the heat pump water heating system 200 may be integrated with utility power or may be a stand-alone or micro-grid system. In an embodiment utilizing the supplemental heating element 110, the controller may operate the supplemental heating element if electrical power is available in excess of that required to run the heat pump 150. Alternatively, if insufficient electrical power is available to operate the heat pump 150, the available power may be applied to the supplement heating element 110. In a further embodiment, the heat pump water heating system 200 may include other active loads 92, which may be selectively powered by the controller 80.

In one embodiment, the heat pump water heating system 200 includes an ambient temperature sensor 164. The output of this sensor 164 may be utilized by the controller 80 to selectively operate the heat pump 150. As will be appreciated, the heat pump 150 operates by removing heat from the ambient air surrounding the hot water heater. In instances where the ambient air is below a threshold temperature (e.g., 68° F.) removal of thermal energy from the ambient air may not be desirable. That is, removal of heat from the ambient air may require additional heating of the structure where the hot water heater is housed. Accordingly, in such instances, the heat pump 150 may be deactivated and the supplemental heating element 110 may be operated. Such a threshold may be set by a user and may further be dependent on the time of year (e.g., higher threshold in the winter, lower threshold or no threshold in the summer etc.). In further embodiments, the heat pump water heating system 200 may include ducting that allows the system 200 to draw or exhaust air for the heat pump from outside air. In such an arrangement, such ducting may include valves to selectively draw/exhaust air from interior and exterior locations to the benefit of the user.

Though discussed primarily as incorporating a heat pump with a hot water heater, it will be appreciated that the heat pump and control system may be utilized for other water heating applications. One such application is heating a pool or hot tub. In such an arrangement, the condenser of the heat pump system is disposed within the pool, hot tub or circulation conduit of the pool/hot tub. Likewise, the pool or hot tub (or other water storage device) may include the secondary heating element.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. For instance, it will be appreciated that various aspects of the presented invention may be applicable to differently configures hot water heaters. That is, aspects of the different embodiments may be individually or in any combination. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

The invention claimed is:

1. A water heating system, comprising:
   a water tank including:
      an interior area;
      an inlet to the interior area connectable to a water supply; and
      an outlet from the interior area;
   a heat pump having a compressor, an evaporator, an expansion device and a condenser coil, wherein the condenser coil is at least partially disposed within the interior area of the water tank and wherein the compressor, the evaporator, the expansion device and the condenser coil form a closed loop coolant system containing a refrigerant;
   a first electrical resistive heating element disposed within the interior area of the water tank;
   a second heating element disposed within the interior area of the water tank, the second heating element connected to a utility power source;
   a controller operatively connectable to a photovoltaic (PV) array for selectively supplying electrical power from said PV array to the first electrical resistive heating element and the heat pump, wherein the controller is configured to:
      connect the first electrical resistive heating element to said electrical power from said PV array when an ambient temperature outside the water tank is below a predetermined threshold, wherein the heat pump is disconnected from said electrical power from said PV array;
      connect the heat pump to said electrical power from said PV array when the ambient temperature is above the predetermined threshold; and
      wherein the controller is operative to activate and deactivate the second heating element based on a level of said electrical power from said PV array.

2. The system of claim 1 further comprising:
   a switching circuit for receiving the electrical power from said PV array and selectively applying said electrical power to the heat pump and the first electrical resistive heating element.

3. The system of claim 1, further comprising:
   a second heating element connected to a utility power source, wherein the controller is operative to activate and deactivate the second heating element based on a water temperature in the water tank.

4. The system of claim 1, further comprising:
   a second heating element connected to a utility power source, wherein the processor supports control logic that is adapted to identify expected usage times when water passes through the water tank between the inlet and the outlet and control the first electrical resistive heating element, the second heating element and the heat pump based at least in part on the usage times.

5. The system of claim 1, further comprising:
   a thermostat operative to generate an output indicative of a temperature in the tank, wherein the controller is configured to connect and disconnect one or both of the first electrical resistive heating element and the heat pump with said electrical power based on the output of the thermostat.

6. The system of claim 1, wherein the processor supports control logic that is adapted to identify a level of said electrical power from said PV array and dynamically allocate said electrical power between at least one electrical application load and one or both of the first electrical resistive heating element and the heat pump.

7. The system of claim 6, wherein at least one electrical application load comprises an electrical outlet.

8. The system of claim 7, wherein the control logic generates control signals for receipt by a switching circuit, wherein the switching circuit connects said electrical power to at least one of the at least one electrical application load and one or both the first electrical resistive heating element and the heat pump in accordance with the control signals.

9. The system of claim 1, wherein the processor is further configured to connect both of the first electrical resistive heating element and the heat pump with said electrical power from said PV array when the ambient temperature is above the predetermined threshold and a level of said electrical power from said PV array is above a predetermined level.

* * * * *